United States Patent
Monzyk et al.

(10) Patent No.: US 6,824,592 B2
(45) Date of Patent: Nov. 30, 2004

(54) APPARATUS FOR HYDROGEN SEPARATION/PURIFICATION USING RAPIDLY CYCLED THERMAL SWING SORPTION

(75) Inventors: Bruce F. Monzyk, Delaware, OH (US); Anna Lee Y. Tonkovich, Marysville, OH (US); Yong Wang, Richland, WA (US); David P. VanderWiel, Columbus, OH (US); Steven T. Perry, Galloway, OH (US); Sean P. Fitzgerald, Columbus, OH (US); Wayne W. Simmons, Dublin, OH (US); Jeffrey S. McDaniel, Columbus, OH (US); Albert E. Weller, Jr., Columbus, OH (US); Chad M. Cucksey, Columbus, OH (US)

(73) Assignee: Battelle Memorial Institute, Columbus, OH (US)

( * ) Notice: Subject to any disclaimer, the term of this patent is extended or adjusted under 35 U.S.C. 154(b) by 0 days.

(21) Appl. No.: 10/298,073

(22) Filed: Nov. 15, 2002

(65) Prior Publication Data

US 2003/0116016 A1 Jun. 26, 2003

Related U.S. Application Data

(62) Division of application No. 09/845,778, filed on Apr. 30, 2001, now Pat. No. 6,503,298.

(51) Int. Cl.⁷ ............................................. B01D 53/04
(52) U.S. Cl. .............................. 96/4; 96/126; 96/146; 96/154; 420/900
(58) Field of Search ............................... 95/55, 56, 90, 95/96, 99, 106, 114–116, 148; 423/248, 648.1; 420/900; 96/4, 126, 130, 146, 154

(56) References Cited

U.S. PATENT DOCUMENTS

| | | | |
|---|---|---|---|
| 4,055,962 A | 11/1977 | Terry | 62/102 |
| 4,528,003 A | 7/1985 | Dittrich et al. | 55/158 |
| 4,819,718 A * | 4/1989 | Ishikawa et al. | 165/104.12 |
| 4,849,774 A | 7/1989 | Endo et al. | 346/140 |
| 5,205,841 A * | 4/1993 | Vaiman | 95/46 |
| 5,556,603 A * | 9/1996 | Succi et al. | 422/213 |
| 5,674,301 A | 10/1997 | Sakai et al. | 48/61 |
| 5,895,519 A * | 4/1999 | Lorimer | 95/56 |
| 5,989,319 A | 11/1999 | Kawae et al. | 96/11 |
| 6,126,723 A | 10/2000 | Drost et al. | 96/4 |
| 6,174,049 B1 | 1/2001 | Tachihara et al. | 347/65 |
| 6,207,132 B1 * | 3/2001 | Lin et al. | 423/648.1 |
| 6,293,998 B1 | 9/2001 | Dolan et al. | 95/96 |
| 6,488,838 B1 * | 12/2002 | Tonkovich et al. | 208/108 |
| 6,503,298 B1 | 1/2003 | Monzyk et al. | 95/96 |
| 6,508,862 B1 | 1/2003 | Tonkovich et al. | 95/106 |
| 6,630,012 B2 | 10/2003 | Wegeng et al. | 95/106 |

FOREIGN PATENT DOCUMENTS

| | | |
|---|---|---|
| EP | 976 679 A1 | 2/2000 |
| JP | 1-298001 A * | 12/1989 |
| WO | WO 97/46482 | 12/1997 |
| WO | WO 00/45940 | 8/2000 |
| WO | WO 01/12312 A2 | 2/2001 |

OTHER PUBLICATIONS

PCT/US02/11860, PCT Written Opinion.

(List continued on next page.)

Primary Examiner—Frank M. Lawrence
(74) Attorney, Agent, or Firm—William B. Richards; Frank Rosenberg

(57) ABSTRACT

The present invention provides apparatus and methods for separating hydrogen. In preferred embodiments, the apparatus and methods utilize microchannel devices with small distances for heat and mass transfer to achieve rapid cycle times and surprisingly large volumes of hydrogen separated in short times using relatively compact hardware.

52 Claims, 9 Drawing Sheets

OTHER PUBLICATIONS

Viswanathan et al., "Microscale Adsorption For Energy And Chemical Systems," May 2000, PNNL Website.

Karperos, "Operating Characteristics Of A Hydrogen Sorption Refrigerator," Part 1 :Experiment Design And Results, 1986, Proceedings Of The Fourth Int'l Cryogenic Conference, Easton, Md.

Simonovic et al., "Kinetics Of Tantalum Hydriding The Effect Of Palladization," 2000, Int'l J. Of Hydrogen Energy 25, pp. 1069–1073.

Feng et al., "Hollow–Fiber Absorbers For Gas Separation By Pressure–Swing Adsorption," 1998, AIChE Journal, pp. 1555–1562.

Barthels et al., "Phoebus–Julich: An Autonomous Energy Supply System Comprising Photovoltaics, Electrolytic Hydrogen Fuel Cell," 1998, Int'l J. Hydrogen Energy, vol. 23, pp. 295–301.

Moss et al., "Composite Metal Membranes For Hydrogen Separation Applications," 1997, National Hydrogen Association.

Zaluski et al, "Nanocrystalline Hydrogen Absorbing Alloys," 1996, Transtec Publications, vol. 225–227, pp 853–858.

Mordkovich et al., "Chemical Compression Of Hydrogen Up To 40 GPa: Problems Of Materials And design," 1994, Hydrogen Energy Progress X, Proc. 10th World Hydrogen Energy Conf., vol. 2, pp. 1029–1038.

Ming Au et al., "Rare Earth–Nickel Alloy For Hydrogen Compression," 1993, Journal Of Alloys And Compounds vol. 201, pp. 115–119.

Da Silva, "Industrial Prototypes Of Hydrogen Compressor Based On Metallic Hydrides Technology," 1994, Hydrogen Energy Progress, Proc. 10th World Hydrogen Energy Conf., vol. 2, pp. 1029–1038.

Kumano et al., "Development Of High Pressure Metal Hydrides For A Compressor," 1989, Zeitschr. F. Phys. Chemie Neue Folge, Bd. 164, pp. 1509–1514.

Willey et al., "The Improvement Of The Hydrogenation Properties Of Nickel–Metal Hydride Battery Alloy By Surface Modification With Platinum Group Metlas (PGMs)," 1999, Journal Of Alloys And Compounds, pp. 613–620.

Heung, "Multistage Metal Hydride Compressor," 1986, Proc. Solid Storage Science And Engineering Meeting, Los Alamos.

Piraino et al., "Heat–Actuated Metal Hydride Hydrogen Compressor Testing," 1985, P. D. Metz, BNL 38317.

Jones et al., "Design Life Testing And Future Designs Of Cryogenic Hydride Refrigeration Systems," 1985, Cryogenics, vol. 25.

Podgorny et al., "A Metal–Hydride Technique For The Compression Of Hydrogen," 1984, Hydrogen Energy Progress V, Proc. 5th World Hydrogen Energy Conf. Toronto, vol. 3, pp. 1317–1325.

Lynch et al., "Hydrogen Compression By Metal Hydrides," 1984, Hydrogen Energy Progress V, Proc. 5th World Hydrogen Energy Conf., Toronto, 1984, vol. 3, pp. 1327–1337.

Golben, "Multi–Stage Hydride–Hydrogen Compressor," 1983, Proc. 18th IECEC, Orlando, Florida, vol. 4, pp. 1746–1753

Nomura et al., "Development Of A Metal Hydride Compressor," 1983, J. Of The Less–Common Metal, 89, pp. 551–558.

Tuscher et al., "A Chemical Compressor Based On Compacted Metal Hydrides," 1982, Proc. Miami Int, Symp., pp. 675–680.

Uchida et al., "Kinetics Of Hydrogen Absortion By Titanium, Tantalum, Tungsten, Iron And Palladium Films With And Without Oxygen Preabsortion At 300 k," 1983, J. Of The Less–Common Metals, 95, pp. 139–146.

Boser et al., "The Rate Limiting Processes For The Sorption Of Hydrgoen In LaNi5," 1975, Proc. 10th IECEC, pp. 1363–1369.

Wenzl et al., "Hydrogen Storage In Thin Film Metal Hydrides," 1983, J. Of The Less–Common Metals, 89, pp. 489–494.

Reilly et al., "A New Laboratory Gas Circulation Pump For Intermediate Pressures," 1971, Rev. Scientific Instruments, vol. 42, No. 10.

* cited by examiner

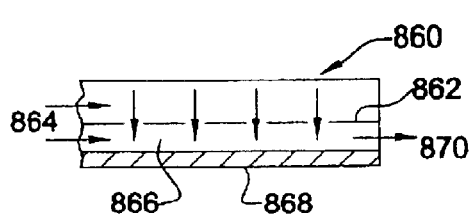
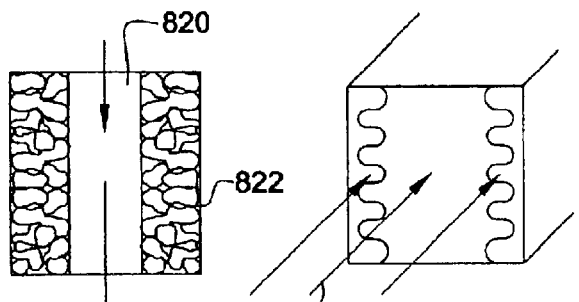
FIG. 5(a)   FIG. 5(b)   FIG. 5(c)
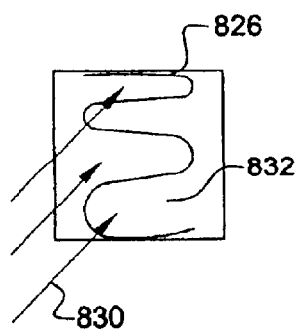
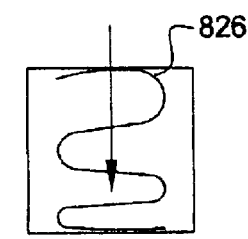
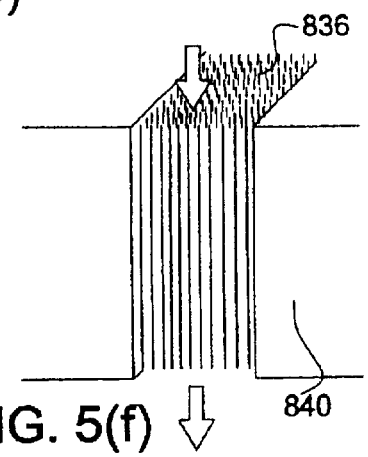
FIG. 5(d)   FIG. 5(e)   FIG. 5(f)
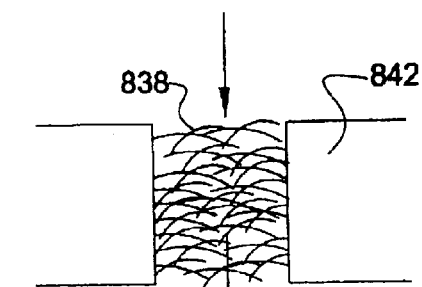
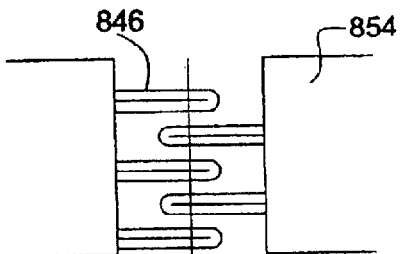
FIG. 5(g)   FIG. 5(h)
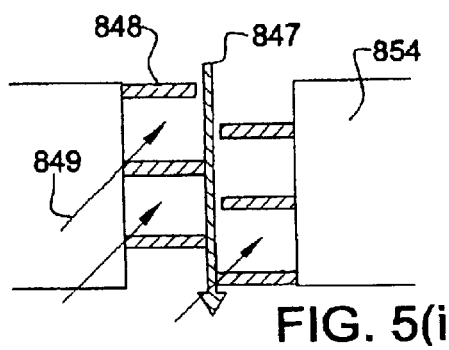
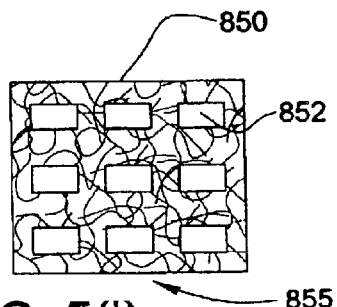
FIG. 5(i)   FIG. 5(j)

APPARATUS FOR HYDROGEN SEPARATION/PURIFICATION USING RAPIDLY CYCLED THERMAL SWING SORPTION

RELATED APPLICATIONS

This application is a divisional Ser. No. 09/845,778, filed Apr. 30, 2001, now U.S. Pat. No. 6,503,298, which is incorporated herein by reference.

FIELD OF THE INVENTION

The present invention relates to hydrogen separation by thermally cycled sorption and desorption. The invention also relates to apparatus containing hydrogen sorbents.

INTRODUCTION

Purified hydrogen has long been and continues to be used in a variety of industrial processes. For example, petroleum refineries are using increasing quantities of hydrogen to meet regulatory requirements on diesel, gasoline, and other petroleum products. Hydrogen-based treating processes are expected to grow substantially because fuel regulations in North America, Europe, and other regions are becoming increasing stringent. For example, the sulfur levels in U.S. diesel fuels must decrease from the current level of 250 ppm to 15 ppm by 2007. While several options exist for lowering sulfur levels, all of commercially available processes require a hydrogen input stream.

Another major use of hydrogen is in upgrading crude oil to make gasoline. To meet the world's increasing demand for gasoline, it has been necessary to develop poorer grades of crude oil that are denser and require hydrogenation for upgrading to gasoline.

Additionally, for more than 10 years there have been intense research and development efforts directed toward hydrogen as a clean power source for fuel cells. Compared to conventional power systems, hydrogen-powered fuel cells are more energy efficient, more robust, and less polluting. Fuel cells can totally eliminate ozone and nitrogen oxides, the most noxious precusors of smog. However, problems such as excessive cost, equipment size, and process complexity have prevented hydrogen-based fuel cell technology from replacing most conventional power sources.

The present invention provides apparatus and methods for separating hydrogen. The invention can be used, for example, to purify hydrogen formed in a steam-reforming reaction (typically a gas containing hydrogen, carbon monoxide and carbon dioxide). Compared to conventional hydrogen separation technology, many of the configurations and procedures of this invention are relatively simple, scaleable over a broad range, including small, and are amenable to cost-effective mass production.

SUMMARY OF THE INVENTION

In a first aspect, the invention provides a method of separating hydrogen gas. In this method, a hydrogen-containing gas mixture passes into a channel at a first temperature. This channel includes a sorbent within the channel that has a surface exposed to the gas. Flow through the channel is constrained such that in at least one cross-sectional area of the channel, the furthest distance to a channel wall is 0.5 cm or less. The sorption, at this first temperature, occurs at a rate of at least 0.1 mol of $H_2$/(second)($cm^3$ of sorbent), where the volume of sorbent is the volume of sorbent used in the method and where the rate is averaged over the sorption phase of each cycle and the "first temperature" is the average temperature of the sorbent (measured, for a film, at the interface of the sorbent film and the surface of the flow channel or, for a porous sorbent, within a porous sorbent) during the sorption phase. Then, energy is added to the sorbent to increase temperature of the sorbent to a second temperature that is higher than the first temperature. At the second temperature, hydrogen is desorbed and hydrogen gas is obtained. The "second temperature" is the average temperature of the sorbent (measured as above) during the desorption phase.

In a second aspect, the invention provides a method of separating hydrogen gas that includes a first step of sorbing hydrogen gas. In this first step, a hydrogen-containing gas mixture is passed into a channel at a first temperature. This channel includes a sorbent within the channel that has a surface exposed to the gas. In a second step, energy is added to the sorbent to increase temperature of the sorbent to a temperature that is higher than the first temperature. Then, in a third step hydrogen gas desorbs at a second temperature that is higher than the first temperature and hydrogen gas is obtained. In this method, the second and third steps, combined, take 10 seconds or less and at least 20% of the hydrogen sorbed in the first step is desorbed from the sorbent.

In a third aspect, the invention provides a method of separating hydrogen gas from a gas mixture, in which, in a first step, at a first temperature, a hydrogen-containing gas mixture contacts a sorbent that sorbs hydrogen. This sorbent includes a layer of Pd or Pd alloy overlying a hydrogen sorbent. Then subsequently, in a second step, energy is added to the sorbent, thus bringing the sorbent to a second temperature that is at least 5° C. higher than the first temperature and hydrogen desorbs from the sorbent. The desorbed hydrogen obtained is in a higher purity form than the feed gas mixture.

In a fourth aspect, the invention provides a method for separating hydrogen from a gas mixture, wherein a hydrogen-containing gas mixture is passed into a first sorption region at a first temperature and first pressure, wherein the first sorption region comprises a first sorbent and wherein the sorbent temperature and pressure in the first sorption region are selected to favor sorption of hydrogen into the first sorbent in the first sorption region. Hydrogen is selectively removed from the gas mixture resulting in sorbed hydrogen in the first sorbent and a relatively hydrogen-depleted gas mixture. The relatively hydrogen-depleted gas mixture passes into a second sorption region at a second temperature and second pressure. The second sorption region comprises a second sorbent, and the temperature and pressure in the second sorption region are selected to favor sorption of hydrogen into the sorbent in the second sorption region. Hydrogen is selectively removed from the relatively hydrogen-depleted gas mixture resulting in sorbed hydrogen in the second sorbent and a relatively more hydrogen-depleted gas mixture. The second temperature is different than the first temperature. Heat is added to the first sorbent, through a distance of about 1 cm or less to substantially the entire first sorbent, to raise the first sorbent to a third temperature and hydrogen desorbs from the first sorbent. Heat is added to the second sorbent, through a distance of about 1 cm or less to substantially the entire second sorbent, to raise the second sorbent to a fourth temperature, and hydrogen desorbs from the second sorbent. Hydrogen desorbed from the first and second sorbents is obtained. The amount of hydrogen obtained from the first and second sorbents is greater than the amount that would have been obtained by operating the first and second sorbents at the same temperature, given the same total amount of added heat. Although this fourth aspect of the invention is generally applicable, it is preferred to locate the sorbent in a channel having a dimension of one cm or less that is in thermal contact with a heat exchanger to achieve rapid and efficient thermal transport.

The invention also provides an hydrogen separation apparatus in which a flow channel having an internal surface that comprises palladium (which includes a palladium alloy) on at least a portion of the internal surface. The flow channel has at least one dimension of 1 cm or less, and a heat exchanger is in thermal contact with the flow channel.

The invention further provides an hydrogen separation apparatus in which a flow channel includes an inlet, an outlet and a sorbent disposed between the inlet and the outlet. The sorbent comprises a hydrogen sorbent having a surface coating over more than 90% of the surface of the hydrogen sorbent, wherein the surface coating comprises palladium. A heat exchanger is in thermal contact with the sorbent.

In yet another aspect, the invention provides an hydrogen separation apparatus containing a flow channel with a thin film of a hydrogen sorbent. Because the film is so thin, it adheres to the apparatus even after multiple sorption/desorption cycles—conditions in which conventional hydrogen sorbents (such as nickel) would crumble.

Any of the apparatus described herein can be used to separate hydrogen from a hydrogen-containing gas mixture. The invention includes this apparatus and methods using any of the apparatus described herein to separate hydrogen.

The low pressure changes involved in the temperature swing sorption (TSS) process of the invention allow very thin metal shim and foil construction, hence, allowing very low metal mass and therefore very fast cycle times. Thin-walled construction also allows high surface area per volume of TSS device, thereby producing high rates of productivity per unit volume of equipment, thereby providing a high productivity rate needed for industrial scale processing. Also, an important facet of the invention is that the high surface area per unit volume (SA/V) feature of the hardware allows the sorbent to be deposited within the device in a high surface area, thin film fashion. Hence, the hydride, once formed on the surface of the sorbent, does not need to migrate far to fully load the sorbent internal solid volume, which, in comparison, would be a slow process in conventional sorbent beds containing coarse particles that are needed to reduce pressure drop across the bed. At these conditions, Pd loads very little hydrogen. In the present invention, the thin metal film/foil/shim can be fully loaded with hydride quickly due to the short diffusion distances. A benefit to the above TSS design is that, since only very thin sorbent layers are needed, sorbent material normally considered too costly, such as Pd, can be used.

Although the ability of palladium to selectively sorb large volumes of hydrogen has been long known, we have surprisingly discovered that a fast rate of sorption and desorption occurs for hydrogen, in properly constructed apparatus or properly conducted methods, allows rapid thermal cycling to efficiently separate relatively large volumes of hydrogen gas (henceforth just hydrogen) with relatively small hardware volumes. Numerous advantages are provided by various embodiments of the present invention including: reduced cost, reduced volume of separation hardware, durability, stability, separation speed, ability to separate large volumes of hydrogen with a small volume of equipment, improved energy efficiency and reduced cost relative to packed bed or membrane technology.

The invention includes apparatus having any of the configurations indicated in the figures. However, these specific configurations are not the only means to carry out the invention and, therefore, should not be interpreted as limiting the inventive apparatus or methods. The invention also includes methods in which a hydrogen-containing gas mixture passes through any of the illustrated apparatus. For example, with reference to FIG. 5a, the invention includes a method in which a hydrogen-containing gas flows through a flow distribution sheet and the distributed flow passes into a sorbent-containing compartment.

GLOSSARY

"Hardware volume" means the external volume of the hydrogen separator apparatus including the sum of all parts if the apparatus is not integrated in a single unit.

"Internal surface" refers to the surface area in the interior of the flow channel that is exposed to flowing gas. Internal surface may be measured by appropriate techniques such as optical measurement or $N_2$ adsorption.

"Sorption/desorption" refers to the total amount of gas taken in without regard to the mechanism by which the gas is taken in. In other words, "sorption" is the sum of adsorption and absorption.

The term "hydrogen-containing gas mixture" means a gas mixture containing between 1 and 999,999 parts per million (ppm) hydrogen (including its isotopes) and at least one ppm of a gas other than hydrogen or its isotopes.

The term "obtaining" means that the hydrogen is recovered either for storage or for use in a subsequent chemical process such as combustion, fuel cell operation, chemical synthesis, etc. The term "obtaining" does not mean, however, that the hydrogen is used simply as a refrigerant.

The term "heat exchanger" means a component, or combination of components, that is capable of adding and removing heat. Preferred examples of heat exchangers include microchannels that can be switched from hot to cold fluids, electrical resistors in combination with a heat sink, and thermoelectric materials.

BRIEF DESCRIPTION OF THE DRAWINGS

FIG. 5 illustrates cross-sectional schematic views of sorption chamber configurations including (a) a flow distribution sheet that distributes flow into a sorbent-containing compartment; (b) a bulk flow channel disposed between porous sorbent layers; (c) dual corrugated sorbent; (d) corrugated sorbent with gas flow over the sorbent surface; (e) corrugated sorbent with gas flow through the sorbent; (f) wires of sorbent material; (g) fibers; (h) baffles having coatings of porous sorbent material; (i) baffles composed of porous sorbent material; and (j) a porous matrix with bulk flow channels.

THEORY OF THERMAL SWING SORPTION IN MICROCHEMICAL SYSTEMS

Figure 1:
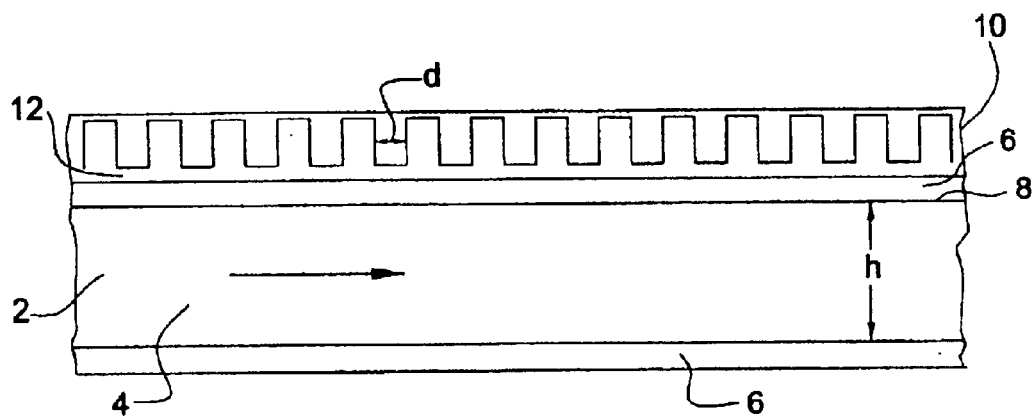
FIG. 1 is a schematic cross-sectional representation of a flow channel and heat exchanger.

The use of a microchannel architecture has distinct advantages for sorption based separation and purification processes. In particular for thermal swing based sorption, the ability to rapidly heat and cool systems enables more effective use of the sorbent bed. In addition, the form of an engineered sorbent can reduce mass transfer resistance.

Mass Transfer Time Comparison

For unsteady-state mass transfer, the time for a solute to diffuse through a porous matrix is defined in (1).

$$\tau = \frac{x^2}{D_e} \tag{1}$$

Where $\tau$ equals the time required to diffuse a distance x, and x is the distance over which diffusion occurs, and $D_e$ is the effective diffusivity for a solute in solution within the porous matrix. The effective diffusivity is defined as the molecular diffusivity ($D_a$) divided by a tortuosity factor for a specific porous geometry. For pores that are roughly straight, the tortuosity factor approaches unity. For pores that are non-straight and meander through a solid matrix, the tortuosity factor may be on the order of 10.

The value of the molecular diffusivity varies as a function of both the solute and the solution at varying temperatures and pressures. Typical values of molecular diffusivities ($D_a$) for gas phase solutes in a gaseous solution range from 0.1 to 0.01 cm$^2$/s. Typical values for molecular diffusivities ($D_a$) for liquid phase solutes in a liquid phase solution range from $10^{-4}$ to $10^{-5}$ cm$^2$/s. The tortuosity factor varies greatly as a function of the tortuous nature of pores within porous pellets or substrates. For the purposes of comparing microchannel systems with conventional, a common tortuosity value is selected of 3.

For a cylindrical or spherical pellet, the diffusion distance x, is half the pellet diameter ($d_{pellet}$). A typical dimension for a pellet used in a conventional sorption system is on the order of 1 cm. The typical time required for gas phase diffusion of the solutes within the porous pellet is defined by (2–3).

$$\tau_{pellet} = \frac{x^2}{D_e} = \frac{\frac{d_{pellet}^2}{4}}{\frac{0.1 - 0.01 \text{ cm}^2/\text{s}}{3}} \sim 7.5 \text{ to } 75 \text{ seconds for a gas phase solution} \tag{2}$$

$$\tau_{pellet} = \frac{x^2}{D_e} = \frac{\frac{d_{pellet}^2}{4}}{\frac{10^{-4} - 10^{-5} \text{ cm}^2/\text{s}}{3}} \sim 7500 \text{ to } 75000 \text{ seconds for a liquid phase solution} \tag{3}$$

Because the time for diffusion varies as a function of the square of the distance, decreasing the diffusion distance plays a disproportionate role in reducing the time required for diffusion. In conventional sorption technology, smaller pellets may be used, but at the expense of the overall system pressure drop. Bulk flow travels through the interstices between the randomly packed pellets. As the size of the pellet is reduced, the size of the interstices is also reduced, thus giving a greater net pressure drop for an equal size bed length.

The diffusion path length for a microchemical based sorption system is considerably smaller than conventional technology. The maximum thickness or diffusion distance for an engineered sorbent in a microchannel is about 2 mm. Preferably, the thickness of the engineered sorbent (for example a sorbent coated on a metal foam) is less than 1 mm, more preferably closer to 0.25 mm. The actual thickness of an engineered sorbent can be set through an optimization of opposing variables. Thicker engineered sorbents will have more sorbent volume (active sites for sorption) and thus a higher capacity. However, thicker engineered sorbents will also have a longer mass transfer and heat transfer time. The characteristic time for mass transfer in a microchannel based engineered sorbent is defined in (4–5).

$$\tau_{eng-sorbent} = \frac{x^2}{D_e} = \frac{0.025^2 \text{ cm}^2}{\frac{0.1 - 0.01 \text{ cm}^2/\text{s}}{3}} \sim 0.02 \text{ to } 0.2 \text{ seconds for a gas phase solution} \tag{4}$$

$$\tau_{eng-sorbent} = \frac{x^2}{D_e} = \frac{0.025^2 \text{ cm}^2}{\frac{10^{-4} - 10^{-5} \text{ cm}^2/\text{s}}{3}} \sim 20 \text{ to } 200 \text{ seconds for a liquid phase solution} \tag{5}$$

The mass transfer time for a sorbate in an engineered sorbent housed within a microchannel is on the order of 100 to 1000 times shorter than in a conventional sorbent pellet for both gaseous and liquid phase separations. The actual values for mass transfer times will vary with the actual values of molecular diffusivities, tortuosity factors, and actual distance for mass transfer within a pellet or engineered sorbate.

Heat Transfer Time Comparison

The characteristic time for heat transfer may be a function of either conduction through the medium that separates the heat transfer fluid and through the sorbent, or the time may be a function of the time required for convection heat transfer to occur between the heat transfer fluid and the separating medium or wall.

For the case of convection-limited heat transfer, the lumped parameter method is appropriate for predicting characteristic times for heat transfer. This method is appropriate when the Biot (Bi) number is less than 0.1. The Biot number is defined by (6).

$$Bi = \frac{h\left(\frac{V}{A}\right)}{k} \quad (6)$$

Where h equals the convective heat transfer coefficient, V equals the volume through which heat transfer is occurring, A is defined by the surface area in the plane of and normal to heat transfer, and k is the thermal conductivity of the material.

The value of the convective heat transfer coefficient (h) in a microchannel, as empirically measured for a gaseous heat transfer fluid, typically varies from 200 to 2000 $W/m^2$-K. The value for a liquid heat transfer fluid in a microchannel typically range from 10,000 to 30,000 $W/m^2$-K. Values for convective heat transfer coefficients in conventional sized heat exchange systems are typically at least one order of magnitude smaller for both gaseous and liquid heat transfer fluids.

The value for the thermal conductivity (k) is well defined for most metals, and can be measured for the porous sorbents. For the purposes of comparing a microchannel based system to a conventional sorption system, typical values are selected for k. Assuming aluminum as a material of construction, the thermal conductivity of the metal is roughly 220 W/m-K. An aluminum foam is selected as a typical engineered sorbent substrate, and an estimated effective thermal conductivity is defined as roughly 10 W/m-K. Ceramic-based pellets used as substrates in conventional sorbent systems will have a slightly lower effective thermal conductivity that is closer to 2 W/m-K.

The value for V/A in a microchannel-based system is easily calculated based on the typical rectilinear geometry where V equals Height×Length×Width and A equals Height×Length. The resulting value of V/A is reduced to the Width, which is the critical thickness through which heat must be transferred to and from the heat exchanger and sorbent.

For a cylindrical tube that is typical for housing a conventional fixed bed of sorbent pellets, the value of V/A is reduced to the tube diameter divided by 4. The volume is defined as π×diameter squared/4×Length. The area A for heat transfer is pi×tube diameter×Length.

The resulting Biot number calculations for a gaseous heat transfer fluid are shown in equations (7–9).
Microchannel system (h is in units of $W/m^2/K$, k is in units of W/m/K, V/A is in units of m and both typical web and engineered (i.e., porous) sorbent assumed to have a thickness of 0.25 mm)

$$Bi_{web} = \frac{h\left(\frac{V}{A}\right)}{k} = \frac{1000(0.00025)}{220} = 0.0011 \quad (7)$$

$$Bi_{eng-sorbent} = \frac{h\left(\frac{V}{A}\right)}{k} = \frac{1000(0.00025)}{10} = 0.025 \quad (8)$$

Conventional system (same units for h, k, and V/A, and typical bed diameter is at least 10 cm)

$$Bi_{conventional} = \frac{h\left(\frac{V}{A}\right)}{k} = \frac{100(0.025)}{2} = 1.25 \quad (9)$$

Thus for the case of a gaseous heat transfer fluid, the characteristic time for heat transfer in a microchannel system is dominated by convection resistance and for a conventional sorption system, the characteristic heat transfer time is dominated by conduction resistance.

When a liquid is used as the heat transfer fluid, the convective heat transfer coefficient is raised by roughly an order of magnitude. In this regime, the Biot number for heat transfer through the engineered sorbent exceeds 0.1, and thus the characteristic time for heat transfer in a microchannel-based sorption device is dominated by conduction resistance rather than convection resistance. For conventional systems, the Biot number will only get larger and the dominating heat transfer resistance remains conduction.

For the lumped parameter analysis, the characteristic time for heat transfer is defined by equations (10–13). In these equations, T is the actual temperature as a function of time, $T_{ss}$ is the steady state temperature, and T0 is the starting temperature at time equal to 0, or at the start of a cycle.

$$\frac{T - T_{ss}}{T0 - T_{ss}} = \exp(-Bi * Fo) \quad (10)$$

$$Fo = \frac{\alpha t}{\left(\frac{V}{A}\right)^2} \quad (11)$$

$$\alpha = \frac{k}{\rho C_p} \quad (12)$$

Rearranging for the characteristic heat transfer time, t is defined in equation 13.

$$t = \frac{\left(\frac{V}{A}\right)^2 \left(-\ln\left(\frac{T - T_{ss}}{T0 - T_{ss}}\right)\right)}{\alpha Bi} \quad (13)$$

The value of α for an aluminum web at ambient conditions is roughly 9×10⁻⁵ m²/s. The value of α for an aluminum foam is roughly 4×10⁻⁵ m²/s.

Solving for the time required for the temperature within the wall to reach 95% of the temperature of the heat transfer fluid is shown in equation (14).

$$t = \frac{(0.00025 \text{ m})^2(-\ln(0.05))}{9 \times 10^{-5} \frac{m^2}{s} 0.0011} = 1.9 \text{ sec} \quad (14)$$

Solving for the time required within the engineered sorbent to reach 95% of the temperature of the heat transfer fluid is shown in equation (15).

$$t = \frac{(0.00025 \text{ m})^2(-\ln(0.05))}{4 \times 10^{-5} \frac{m^2}{s} 0.025} = 0.19 \text{ sec} \quad (15)$$

The total time for the temperature within the engineered sorbent to reach 95% of the initial temperature of the heat transfer fluid is about 2 sec.

If the temperature of the heat transfer fluid is maintained at a much higher temperature than the desired sorption or desorption temperature, then the characteristic time for heat transfer will be considerably shorter. As an example, if only 10% of steady-state is desired, then the characteristic times for heat transfer will be reduced by a factor of 28. An example calculation is shown in equation (16).

$$t = \frac{(0.00025 \text{ m})^2(-\ln(.9))}{9 \times 10^{-5} \frac{\text{m}^2}{\text{s}} 0.0011} = 0.07 \text{ sec} \qquad (16)$$

The additional time for heat transfer through the engineered sorbent will be 0.007 sec. The characteristic time for heat transfer in the conduction-resistance dominated regime is defined by equation (17).

$$t = factor \frac{x^2}{\alpha} \qquad (17)$$

The factor is determined from empirical heat transfer curves and defined for different geometric shapes. For a cylinder of infinite length (e.g., length much longer than diameter) and a desired temperature approach of 95% of steady-state, the factor equals 0.6.

For a packed bed of ceramic sorption pellets, the value of $\alpha$ is approximately $1.3 \times 10^{-6}$ m²/s. Solving for the characteristic heat transfer time for a conventional sorption bed is defined by equation (18).

$$t = 0.6 \frac{0.05^2 \text{ m}^2}{1.3 \times 10^{-6} \frac{\text{m}^2}{\text{s}}} = 1150 \text{ sec} \qquad (18)$$

If an approach of 95% of steady-state is not required and the device is operated to only within 10% of steady-state, then the characteristic time is defined by equation (19).

$$t = 0.1 \frac{0.05^2 \text{ m}^2}{1.3 \times 10^{-6} \frac{\text{m}^2}{\text{s}}} = 192 \text{ sec} \qquad (19)$$

For the microchannel-based sorption system that is dominated by conduction resistance not convection resistance (e.g., a liquid heat transfer fluid not a gaseous heat transfer fluid), then the characteristic time for heat transfer is defined by equation (20) when a 95% approach to equilibrium is desired. If a less restrictive approach to equilibrium is required, then the characteristic time for heat transfer will be even shorter.

$$t = 1.3 \frac{0.00025^2 \text{ m}^2}{4 \times 10^{-5} \frac{\text{m}^2}{\text{s}}} = 0.002 \text{ sec} \qquad (20)$$

Comparison between microchannel-based sorption device and conventional sorption hardware The characteristic time for heat transfer in a microchannel-based sorption device is typically 100 to more than 1000 times shorter than a conventional packed bed sorption device when either a liquid or a gaseous heat transfer fluid is used in the microchannel device.

The characteristic times for heat and mass transport drive the required cycle time for the requisite multi-stage separation device, however they are not equivalent to the cycle time.

Cycle Times

Cycle times can be estimated for a gas and liquid separations. For the case of a liquid heat transfer fluid, the time required for mass transfer time may dominate the cycle time.

For a gaseous phase separation the characteristic mass transfer time is 0.02 to 0.2 sec. This is equivalent to the time for a theoretical plate to equilibrate in a multi-stage equilibrium stage separation model. A cycle may have, for example, 5 to 10 or more theoretical stages. In addition, time for the mixture to move through dead zones of the device must be included within the cycle time calculation. Therefore, the cycle time for a 5 to 10 stage microchannel-based sorption device for a gas-phase separation may be as low as roughly 0.1 to 1 second. The actual value will depend upon a multitude of variables, including the efficiency of the design to reduce dead volume.

For a liquid-phase separation, the required time for mass transfer will always dominate the cycle time in a microchannel device. The characteristic mass transfer time is roughly 20 to 200 seconds in a microchannel device. It is anticipated that the minimum 5 to 10 stage cycle time will be about 100 to 1000 seconds.

Shorter cycle times to achieve the same degree of separation in a microchannel-based sorption device will lead to much smaller bed volumes and thus likely much lower hardware cost. Additional columns and purge streams for heating and cooling are not required in microchannel devices. Conventional TSA processes often mitigate the long characteristic times for conductive heat transfer through the bed volume by introducing a separate purge stream for the purpose of heating or cooling a bed through convective heat transfer prior to a sorption or desorption cycle. This addition of extra streams will thus introduce sorbent bed inefficiencies and added cost by not fully utilizing the sorbent bed at all times for either sorption or desorption.

DESCRIPTION OF THE PREFERRED EMBODIMENT(S)

FIG. 1 illustrates one example of a flow channel 2 including open channel 4 and absorbent 6. The direction of net gas flow through the channel is indicated by the arrow. Flowing gas contacts the sorbent 6 at internal surface 8. For at least part of the flow channel, the distance from any point in the open channel (as measured in a plane perpendicular to flow) to the internal surface is 10 mm or less, preferably 0.1 mm or less. Utilizing a thermal swing sorption device in which flowing hydrogen is in close proximity to the sorbent minimizes the distance and time for mass transport.

In preferred embodiments, the flow channel has: a height h of less than 1 cm, more preferably less than 2 mm, and in some embodiments 0.5 to 2 mm. The width and length may be of any value. However, these parameters have design considerations that lead to optimal designs. Longer lengths will create more active sites for sorption during any given cycle, but at the expense of a higher pressure drop and longer residence time. Increasing the width of the sorbent zone will also create more active sites for sorption. However, increasing width might lead to flow maldistribution issues if the width is too large; although this effect can be mitigated using flow dispersing elements. The length and width can be optimized in view of the fluid properties and the accessible header size relative to the channel size. In some preferred embodiments, width (perpendicular to height and flow) is 0.01 cm to 300 cm, more preferably 2 cm to 25 cm; and length is 0.01 cm to 300 cm, more preferably 2 cm to 25 cm.

The flow channels can be disposed in a chamber that is adjacent an array of heat exchanger microchannels. In an alternative arrangement (not shown), the flow channels can be disposed in an interleaved fashion between (i.e., alternating with coplanar) adjacent channels of heat exchanger channels. In some embodiments, at least 3 layers with flow channels alternate with at least 4 layers with heat exchangers 10. The flow channel can be any shape but is preferably straight with an unobstructed open channel.

The internal surface 8 is preferably a Pd alloy or metallic Pd. It has been found that Pd can sorb and desorb hydrogen at surprisingly fast rates, leading to reduced cycle times. Pd is also a good thermal conductor. Unlike in catalysts, the surface palladium is not dispersed on an oxide surface, and is preferably a continuous layer. At low temperature, hydrogen is rapidly sorbed through surface 8 into sorbent 6. In some preferred embodiments, the sorbent 6 is the same material as the surface 8. In other embodiments, the sorbent 6 includes another material that reversibly sorbs hydrogen. For example, the hydrogen sorbent can contain any of the metal hydride forming elements (see, Greenwood et al., Chemistry of the Elements (1984)). Preferred sorbent materials include Pd, Pd alloy, Ti, V, $LaNi_5$, Al doped nickel lanthanides, and Ni. Because of the excellent selectivity of Pd or Pd alloys for hydrogen on the surface 8, the underlying sorbent 6 need not be selective for hydrogen. For example, a hydride forming sorbent sublayer having a thickness of 10 nm to 1 mm may be coated with a thin Pd surface-exposed sublayer having a thickness of less than 0.025 mm, more preferably about 0.0001 to 0.02 mm. Preferably at least 80%, more preferably at least 90%, of the exposed surface (i.e., the surface exposed to the hydrogen-containing gas in the flow channel) of the sorbent is coated with Pd or a Pd alloy. For some applications, in which excellent selectivity is not required, the sorbent need not have a Pd surface. The thickness of the sorbent layer may be selected based on the volume of sorbent required to sorb a given quantity of hydrogen.

In preferred embodiments, the hydrogen sorbent is a thin layer. Conventional hydrogen sorbents crumble as a result of cycling, thus degrading thermal transport characteristics and degrading device stability. In the present invention, the sorbent layer can be kept thin so that the expansion and contraction of the sorbent/hydride layer does not result in crumbling. Instead, while cracks may form, due to its thinness, the sorbent layer maintains excellent adhesion to the underlying channel or heat exchanger wall. Since the height of flow channels can be made quite small, and the device cycled at high rates, multiple flow channels containing thin sorbent layers can be used in concert to separate significant quantities of hydrogen. In preferred embodiments, the sorbent 6 including surface 8 has a thickness of 0.0001 to 1 mm, more preferably, 0.004 to 0.1 mm. In some preferred embodiments, the sorbent is a dense (nonporous) thin layer, thus maximizing adhesion to the heat exchanger surface and sorbtion capacity as a function of volume.

For maximum use of space, in preferred embodiments, at least 80% of the internal surface of the flow channel is coated with Pd or a Pd alloy. After cycling, some amount of residual hydrogen may remain in the sorbent, but is not a yield loss. Other preferred sorbents include palladium alloys such as a palladium silver alloy. The palladium alloys can enhance durability of the device due to their greater resistance to crumbling over multiple cycles. Preferably, the sorbent material undergoes a phase transition to form a hydride during sorption to enhance the sorbtion capacity and selectivity.

The sorbent may contain a promoter or an intermetallic that improves hydrogen dissociation kinetics thus decreasing sorption time, and reducing overall cycle time. For example, Ru particles on the surface of Pd may increase the rate of hydrogen sorption and desorption. In general, the addition of a secondary (or tertiary) material (often times in very small quantities) to a primary material can influence the net rate of hydrogen (or other gaseous species) adsorption onto the surface of the primary material in a heterogeneous system. By affecting the kinetics of the adsorption process and the surface composition, the added material can also increase the ultimate adsorptive capacity (or apparent capacity) of the primary material surface. The first effect, increasing the rate of hydrogen adsorption (purely a kinetic phenomena), is a two-fold result of the chemical nature of the added material (which results in faster dissociative hydrogen adsorption) and how this chemical nature interacts with the primary material to result in physically-segregated surface structure, which, in turn, can affect the ultimate adsorptive capacity (or apparent capacity).

Ru at defect-like sites adsorb (and subsequently dissociate) hydrogen at a faster rate than Ru atoms lying away from edges or corners, in "basal planes". Thus, the observed (or "apparent") kinetics of hydrogen adsorption on Ru (and many other materials) really represents the superposition of the different kinetics of different Ru sites. This phenomenon can be applied to have the opposite effect: adding an element like Ru to a system that does not adsorb hydrogen as easily/quickly results in faster apparent adsorption kinetics.

The explanation of second effect (the apparent alteration of the ultimate adsorptive capacity of a material) is a bit more complicated, but it is basically an extension of the same concept. Since altering kinetics cannot change the equilibrium of a system, it seems like this concept violates thermodynamics. In reality, though, the observed effect is really due to deconvolution of superimposed effects: different phases of a material have different adsorption stoichiometries (i.e. one packing arrangement (call this arrangement 111) of surface metal atoms (M) may adsorb a gas (A) in a ratio of M(111):A=1:1, while another arrangement (call it 110) (which is present in the same material in a certain proportion) adsorbs more, M(110):A=1:2. Adding a second material (N), which selectively occupies (111) sites and also adsorbs more A, N(111):A=1:2, results in more net adsorption of the gas, A. If N also adsorbs A faster than M, then the first effect and the second effect compliment each other.

The sorbent can be disposed as dense or porous layers on the flow channel walls. The sorbent can be directly coated on the flow channel walls. The sorbent could also be disposed on a porous substrate, preferably a thermally-conductive felt or thermally-conductive continuously porous foam. A porous sorbent, preferably in the form of a monolith, could be inserted into a flow channel. A relatively thin interfacial layer such as a ceramic could be interposed between the porous substrate and sorbent to improve adhesion and/or increase sorbent surface area. Alternatively, the porous substrate could be entirely formed from the sorbent material. In some embodiments, a porous sorbent fills or substantially fills the flow channel such that substantially all the gas flows through the porous sorbent (typically a sorbent-coated porous substrate).

A heat exchanger 10 is in thermal contact with the flow channel. Preferably, the heat exchanger is a microchannel heat exchanger meaning that the channel or channels have a height (the dimension described above) and/or a width d of less that about 2 mm. Flow of the heat exchange fluid in the heat exchanger can be cross-(illustrated), counter- or co-flow in relation to gas flow through the flow channel. Preferably, the heat exchanger is directly adjacent to the flow channel and more preferably the heat exchanger substantially overlaps the flow channel. In a particularly preferred embodiment, the heat exchanger and flow channel are adjacent and substantially coextensive thin layers with width and length substantially larger than height. Preferably the same wall 12 comprises the wall of both the heat exchanger and flow channel and in this embodiment, the wall is included in calculating height of the heat exchanger but not the flow channel. The heat exchanger contacts the flow channel through a thermally conductive material, such as steel, aluminum or plastic. The heat exchanger can utilize any suitable heat exchange fluid, with water and heat transfer liquids (such as Therminol™) being especially preferred, gases and vapors less so. In a particularly preferred embodiment, conditions for sorbtion and/or desorption are selected to coincide with a phase change of a heat transport fluid—for example, very high rates of heat transfer can be obtained by condensing and/or vaporizing stream.

In general, it is highly desirable to form a system with minimal thermal mass. Preferably, thermal swing sorption is conducted at low pressure (preferably about 1 to 1000 psig more preferably 1–300 psig) so that relatively thin walls can be used to contain the system. Low pressure operation can be further aided by operating sorption and desorption in stages with a relatively narrow temperature range that is optimized for a particular pressure range. In preferred embodiments, less structural support is provided in regions that will operate at relatively lower pressure.

Figure 2:
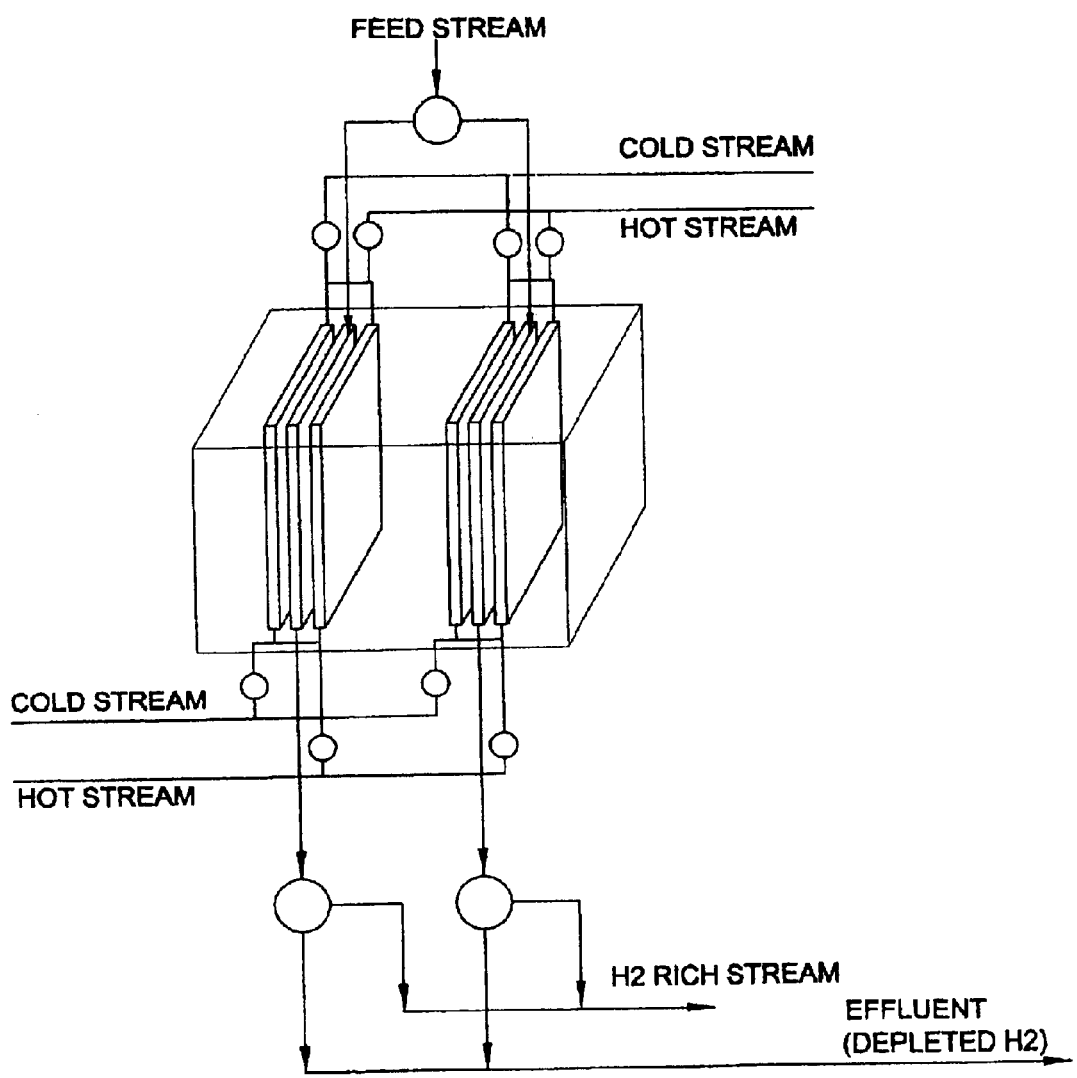
FIG. 2 is a schematic representation of hydrogen sorption apparatus including valves (darkened circles).

FIG. 2 schematically illustrates an embodiment of the invention in which a feed stream is distributed among multiple flow channels each of which is sandwiched between heat exchangers. Valves (indicated by darkened circles) control gas flow as well as heat exchange fluids.

Figure 3A:
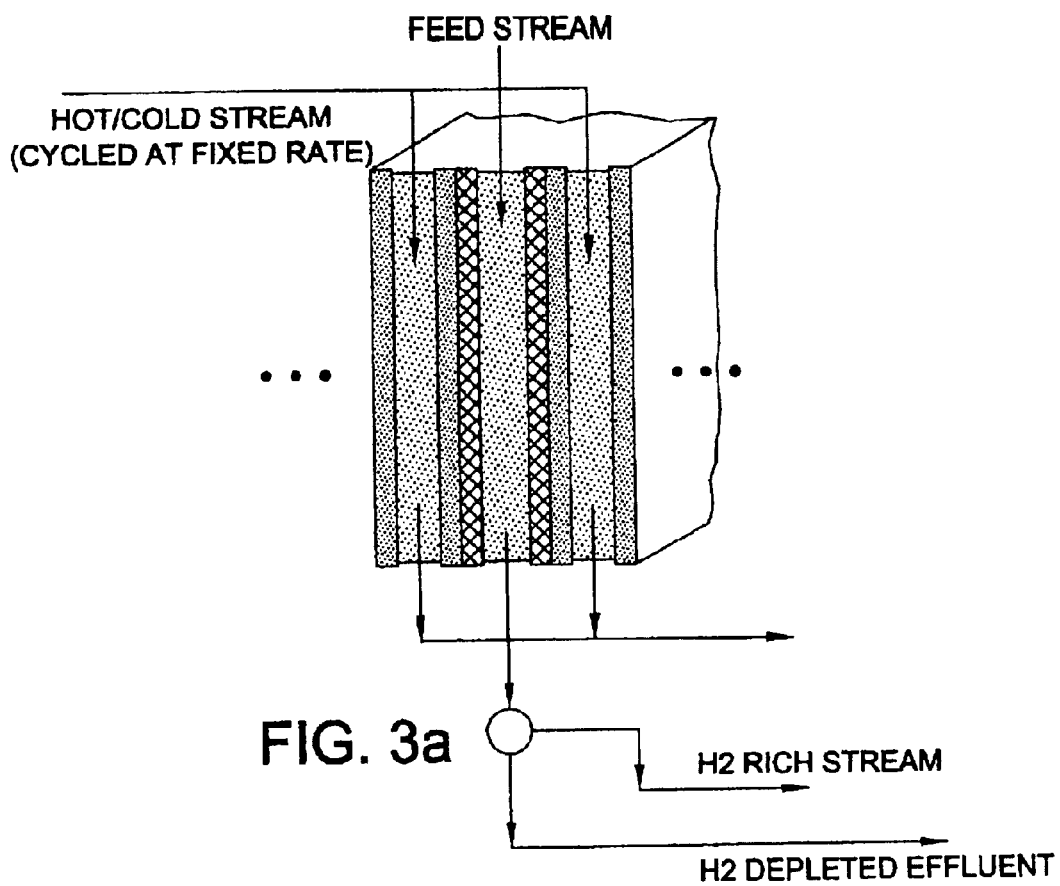
FIG. 3a is a schematic cross-sectional representation of a flow channel and heat exchanger. The sorbent is disposed on the flow channel walls.

FIG. 3a illustrates the case where a sorbent (cross-hatched) is disposed on the sides of an open channel. Hydrogen in the feed stream diffuses from the open channel into the walls where it is sorbed and thus separated from the feed stream. As indicated by the dots in FIG. 3a, the capacity of the device could be readily increased by stacking repeating layers of flow channels and heat exchangers.

Figure 3B:
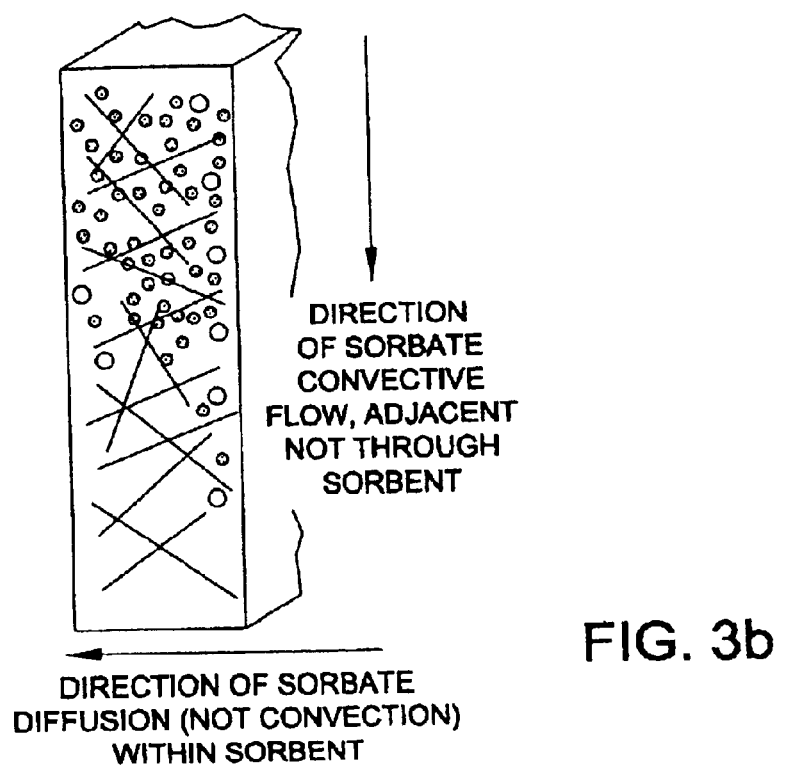
FIG. 3b is a schematic cross-sectional representation of a flow channel containing a porous sorbent and a flow path for convective flow adjacent to the sorbent.

FIG. 3b illustrates a separation process through apparatus such as that represented in FIG. 3a. A gas mixture containing weakly sorbed molecules (o) and strongly sorbed molecules ( ) enters the flow channel. The shaded molecules indicate preferentially sorbed molecules with the lighter shaded circles representing molecules actually sorbed into or onto the sorbent. The pores are sufficiently large to enable fast molecular diffusion within the tortuous 3-D structure. Solutes then may diffuse either molecularly or through Knudsen diffusion within smaller pores found within the active sorbent coated on the engineered sorbent substrate. The size of the smaller pores is less than the size of the large pores. Preferably, the pores are in the micro to mesoporous range to enable a high surface area with many sites for rapid sorption. Sorption occurs at low temperature, and temperature is switched to high temperature before the preferentially sorbed molecules elute from the channel. The purified stream (o) is one of at least two product streams from this process. The process could be designed and operated for a multi-component separation, where a ternary or higher mixture is separated into components rather than just a binary separation. However, separating or purifying multiple streams will require additional stages. Preferably, the microchannel dimension is about 2 mm or less. The height and length may be of any value. The thickness for an engineered (i.e., porous) sorbent is preferably between 100 microns and 500 microns. More preferably, the thickness of the engineered sorbent is between 100 and 250 microns. Convective flow is essentially through a gap that is adjacent to the engineered sorbent. The salutes primarily diffuse through the gap to the engineered sorbent and then continue to diffuse through the engineered sorbent. The direction of diffusion through the engineered sorbent is primarily normal to the direction of convective flow.

Figure 4A:
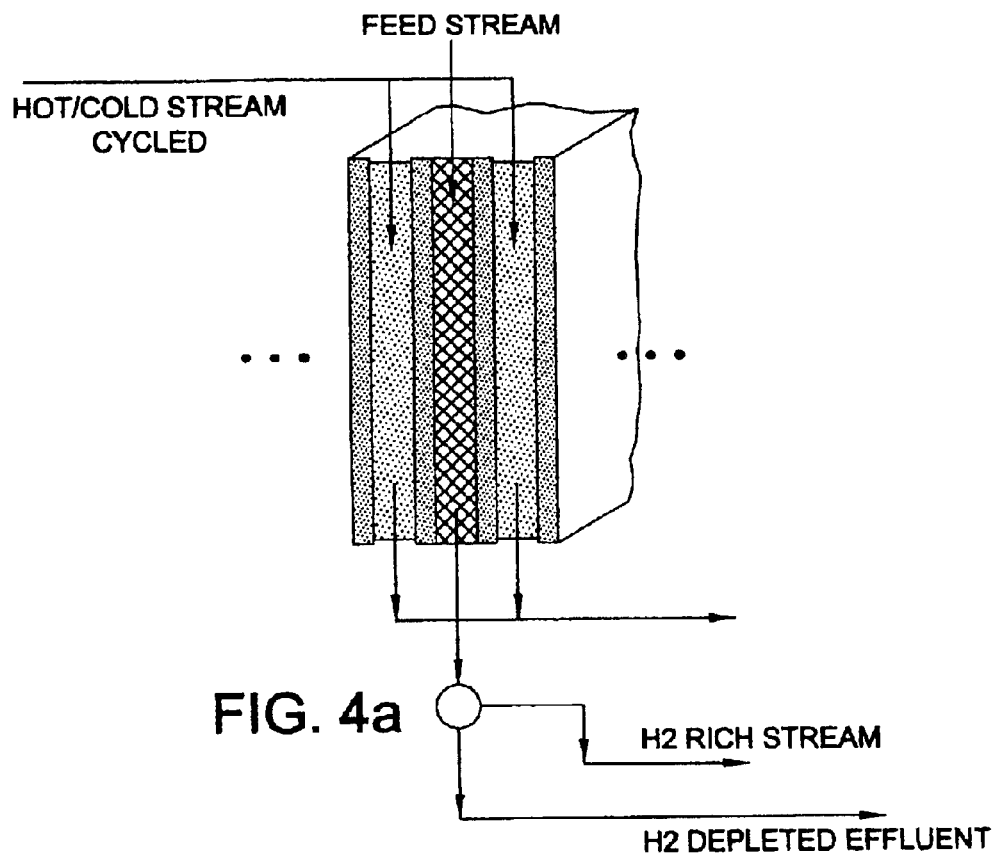
FIG. 4a is a schematic cross-sectional representation of a flow channel and heat exchanger.

FIG. 4a illustrates a configuration in which a porous sorbent (cross-hatched) fills the flow channel. Since the sorbent is porous, flow occurs through the sorbent; however, the pressure drop through the flow channel is generally higher than in the case of an open channel.

Figure 4B:
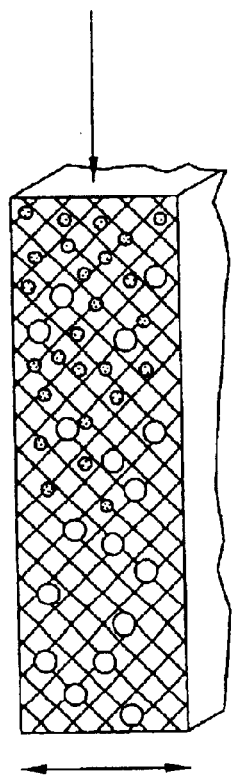
FIG. 4b is a schematic cross-sectional representation of a flow channel filled with a porous sorbent. The sorbent is disposed in the flow channel such that flow is substantially through the sorbent.

FIG. 4b illustrates an alternate embodiment for a porous sorbent within a microchannel-based sorption device. In this embodiment, flow is primarily directly through the sorbent. Diffusion distances for mass transfer within this embodiment may be shorter than in the flow-by configuration shown in FIGS. 1–3. The mass transfer distance is essentially limited by the size of the large pores where convective flow occurs and the coating thickness of the active sorbent agent placed upon the surface of the engineered sorbent substrate. The size of these pores typically range from 10 to 500 microns. However, the reduction in mass transfer resistance will be offset by an increase in pressure drop. As flow is force through the tortuous network of open pores, the increase frictional losses will increase pressure drop. For applications that are not sensitive to maintaining a low-pressure drop, this approach may be preferred.

The "porous materials" described herein refer to porous materials (including porous sorbents) having a pore volume of 5 to 98%, more preferably 30 to 95% of the total porous material's volume. At least 20% (more preferably at least 50%) of the material's pore volume is composed of pores in the size (diameter) range of 0.1 to 300 microns, more preferably 0.3 to 200 microns, and still more preferably 1 to 100 microns. Pore volume and pore size distribution are measured by Mercury porisimetry (assuming cylindrical geometry of the pores) and nitrogen adsorption. As is known, mercury porisimetry and nitrogen adsorption are complementary techniques with mercury porisimetry being more accurate for measuring large pore sizes (larger than 30 nm) and nitrogen adsorption more accurate for small pores (less than 50 nm). Pore sizes in the range of about 0.1 to 300 microns enable molecules to diffuse molecularly through the materials under most gas phase sorption conditions.

FIG. 5a illustrates apparatus 860 where a flow distribution layer 862 (typically a sheet having random, regular, or spaced pores, slots, holes, or the like) can distribute feed 864 along a length of the chamber 866 in a flow path 870. The chamber 866 preferably contains a sorbent material 868 (although illustrated as a single layer along the length of the chamber—thus enabling low pressure drop, it should be recognized that a sorbent material 868 could have any of the configurations described herein).

FIG. 5b illustrates an embodiment in which a bulk flow path 820 is disposed between porous sorbent material 822, although some flow may convectively travel through the large pores in the porous material. Flow through the large pores increases when the pore diameter of the porous insert increases and approaches an order of magnitude below the hydraulic diameter of the open area. This chamber could be configured as a tube, with a ring or partial ring of sorbent, but is more preferably a planar arrangement. The planar arrangement enables economical stacking of chambers with other components such as: additional chambers, heat exchangers, etc. The contiguous, straight-through configuration of the bulk flow channel creates the opportunity to perform gas phase separations with low pressure drops.

Figure 9A:
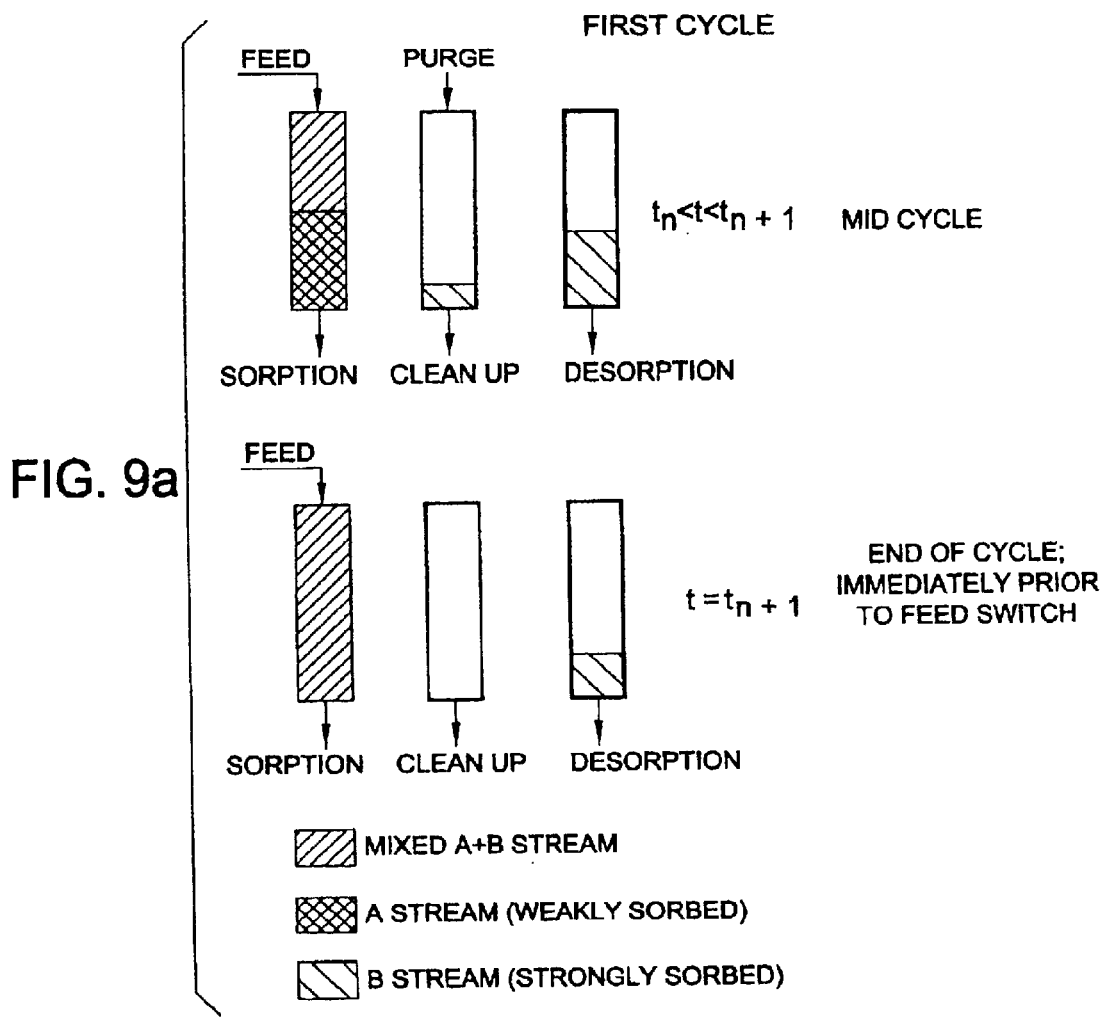
FIGS. 9a–9c schematically illustrate a 3-stage sorption process.

FIGS. 5c and 5d illustrate sorption chamber configurations in which corrugated inserts 826 provide high surface area for sorption while contiguous flow paths 828, 832 enable sorption to be performed with low pressure drops. The inserts 826 either have a surface coating of a porous sorbent material or, preferably, are comprised of a porous sorbent material. A similar configuration is illustrated in FIG. 9d.

FIG. 5e illustrates an embodiment in which a corrugated porous sorbent material 826 is disposed in the sorption chamber such that gas flow is partially through, and around the sorbent. This configuration ensures contact with the porous sorbent; however, this configuration has the disadvantage of significantly higher pressure drops than with an open channel, but the advantage of more intimate contact of the gas with the sorbent surface.

FIGS. 5f and 5g utilize sorbent fibers 836, 838. These fibers may, for example, be porous ceramic, metal or composite fibers. The parallel fibers 836 are preferred because they cause less of a pressure drop. The fibers 838 create tortuous flow through the chamber. In either case, sorbent fibers are preferred over powders because they cause less pressure drop, can have better thermal conductivity, and can provide a more uniform and controlled surface. The chamber walls 840, 842 can be ceramic, plastic, metal (for good thermal conductivity), or composites.

FIGS. 5h and 5i illustrate chambers with baffles 846, 848. Baffles 846 comprise plates or rods composed of a porous sorbent material or that are coated with a sorbent material. Baffles 848 comprise plates or rods composed of a porous sorbent material. Flow can either be parallel 849 or nonparallel 847 or differing solutes can flow in differing directions (e.g. orthogonal solute flows). In either case, there is a contiguous bulk flow through the chamber. These baffles can create turbulence and enhance contact of gaseous solutes with the sorbent. The baffles, which preferably comprise a thermally conductive metal, provide good heat transport to (or from) the walls. The chamber walls 854 may be of the same materials described above for walls 842.

FIG. 5j illustrates a porous sorbent matrix material 850 within which there are contiguous bulk flow channels 852. The matrix 850 can be the chamber walls or the entire article 855 can be an insert that fits into an opening. Preferably the matrix material contains 1 to 10,000 more preferably 10 to 1000 bulk flow channels 852. In a preferred embodiment, the bulk flow channels 852 are essentially straight. In another embodiment, these channels are tortuous. In yet another embodiment, the channels 852 are filled with a sorbent material and bulk flow of solutes and solution is primarily through the matrix.

Figure 6A:
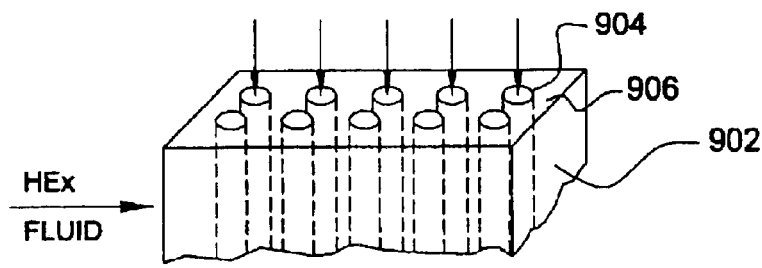
FIG. 6 illustrates schematic views of sorbent chamber configurations including (a) a perspective view of sorbent channels with cross flow of a heat exchange fluid; (b) a cross-sectional view of a porous sorbent material that does not directly contact the walls of the chamber; (c) top—a chamber with a porous plug, and bottom—multiple flow channels with a mixing chamber; (d) a u-shaped channel filled with porous sorbent material; (e) porous dividers; and (f) mixing streams that are directed to flow between layers of porous sorbent material.

FIG. 6a illustrates a sorption apparatus 902 with tubes/chambers 904, each of which may contain a porous sorbent material (not shown) in any of the configurations described herein. The gas mixture flows through the tubes. On the outside of these tubes is a bulk flow volume 906. In a preferred embodiment, a heat exchange fluid flows through the bulk flow volume; flow of the heat exchange fluid can be cross-flow, concurrent flow or counterflow to the flow of gaseous solutes and products.

Figure 6B:
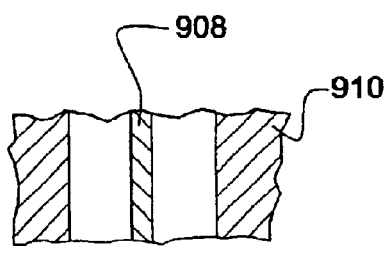

FIG. 6b illustrates a configuration in which a porous sorbent material 908 is disposed within the chamber without direct contact to the chamber walls 910. This embodiment may require longer cycle times to overcome the higher heat transfer resistance. In another embodiment (not shown), the material 908 comprises a core of a large pore structure (in which molecular diffusion occurs) and a small pore structure (through which Knudsen diffusion occurs) on the outer sides. Sorbent may be coated on the small pore structure, or on the large pore structure, or on both.

Figure 6C:
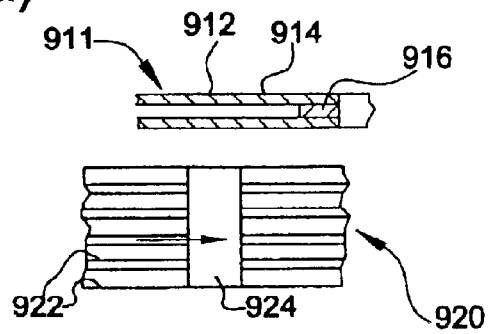

The top of FIG. 6c illustrates a chamber 911 having a bulk flow path 912 and porous sorbent material 914, 916. The porous plug 916 serves to provide sorbent contact to any gaseous species that remain unsorbed after passage through bulk flow path 912. The flow regime in this example, and in other figures, is typically laminar based upon the classical definition of the Reynolds number less than 2000. Although the flow regime may also be transitional or turbulent in the microchannels, this is less common. For laminar flow, there will be gas species that move along the centerline of the channel. Not all molecules may have an opportunity to diffuse to the porous sorbent. For those molecules that do not diffuse to the wall to sorb, this is referred to as 'slip'. The overall sorption may thus be a few percentage points lower than equilibrium would suggest attainable. The use of the porous sorbent material through the entire cross section for a fraction of the channel length serves to reduce slip and enable overall higher sorption capacity.

The bottom of FIG. 6c illustrates a sorption apparatus 920 comprised of multi sorption chambers 922 and a mixing chamber 924. The mixing chamber combines gases from at least two chambers 922. The mixing chamber helps to equalize concentration between multiple chambers by mixing the possibly laminar flow streamlines and helps to ensure a higher overall adsorption than if the at least two chambers were joined into one chamber by reducing the centerline slip of gases.

Figure 6D:
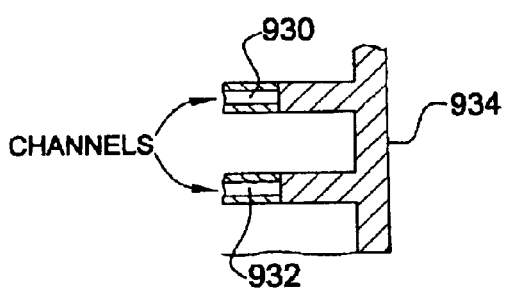

FIG. 6d illustrates a sorption device in which the bulk flow from at least two sorption chambers 930, 932 flow into porous material 934. In an alternative mode of operation, flow enters through flow path 930, through porous material 934 and out through flow path 932. This embodiment also serves to reduce the possible slip of gases and bring the overall sorption closer to that predicted at equilibrium.

Figure 6E:
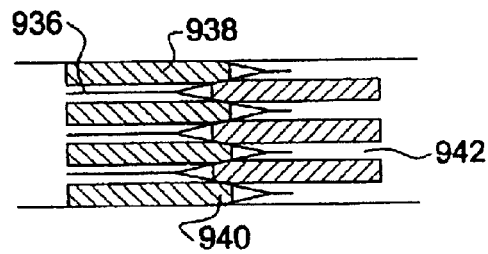

FIG. 6e illustrates a forked configuration in which a gas mixture enters a first compartment 936, having a dimension of about 2 mm or less, and convectively travels past porous sorption material 938 and then travels convectively through porous material 940. While traveling in compartment 936, the feed may diffuse to the porous sorbent. The gas exiting the porous material 940 flows into second compartments 942. The compartments 936 and 942 may or may not be offset. By offsetting porous dividers 938, the gas flows in adjacent first compartments are further mixed to reduce the slip of components.

Figure 6F:
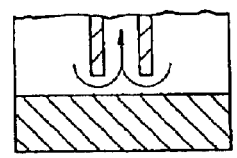

FIG. 6f illustrates a flow configuration where the feed flows along one side of a porous sorbent in the first flow path, makes at least one bend, and then travels back along the other side of the porous sorbent in the opposite flow direction to form at least one second flow path. In an alternate configuration, a second sorbent may be used for the second flow path. In another configuration, a wall may separate the porous sorbents used in the first and second flowpath.

Figure 7:
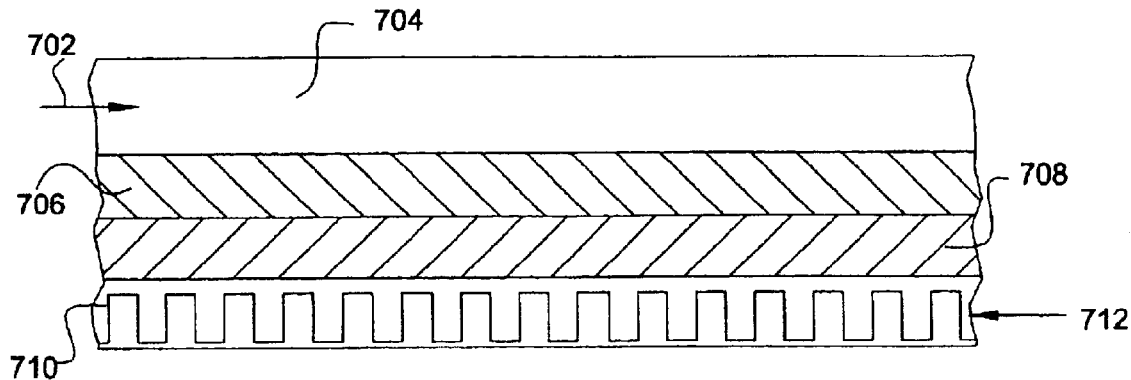
FIG. 7 is a schematic cross-sectional representation of a flow channel and heat exchanger.

Another preferred embodiment is illustrated in FIG. 7. In this embodiment, a hydrogen-containing feed stream 702 passes into open channel 704. During the cool phase of a cycle, hydrogen is selectively sorbed in sorbent 706. To desorb, the feed stream is discontinued and heat is added from electrically resistive heating element 708. Electrical heating in restricted volume devices can rapidly increase temperature (100° C. per second or more, see, e.g. U.S. Pat. Nos. 6,174,049 and 4,849,774 incorporated herein by reference), thus enabling very short desorption phases. Heat from the electrical resistor 708 is then removed through microchannel cooler 710. In this configuration, the heat exchanger is formed by a combination of electrical resistance heating with a coolant fluid 712 (shown in optional counter-current flow). In an alternative embodiment, the sorbent is in the form of a thin film on an electrically insulating material that is in thermal contact with a heat sink (the structure could include, for example, a relatively massive block of a heat conductive material). For desorption, the heating is so fast that a negligible portion of the heat is conducted through the insulating material and into the heat sink. Upon termination of the electrical current, the sorbent rapidly cools to the temperature of the heat sink, and a sorption cycle can begin.

The sorption heat of hydrogen on Pd is about 37,000 J/mole, or 1247 J for 800 cc. One cc of Pd, 11.98 grams, can adsorb 800 cc (289 K) of hydrogen. The heat capacity of the Pd is 0.243 J/gm K. Assuming a temperature change of 20 K, the heat adsorbed by the Pd will be 58 J/cc. The total heat required becomes 1306 J to desorb 800 cc of hydrogen. The electrical resistivity of Pd is 13.8-Ohm cm (371 K). If the Pd film is 3 $\mu$m thick and 1 cm wide, for 1 cc of Pd the strip would be 3333 cm long. If n cm long, the cross section will be $0.0003*n$ cm$^2$ and the length $3333/n$ cm. The resistance of the film is then $1.53*10^8/n^2$. The energy required to heat the Pd and desorb the hydrogen is 1306 Watt seconds per 800 cc, or 1632 Watt seconds per liter. If n is 1000, the current needed to do the heating in 0.3 seconds is 5.3 amp and the potential 816 volts. If n is 2000, the current needed to do the heating in 0.01 seconds is 58.4 amps and the potential 224 volts.

Figure 8:
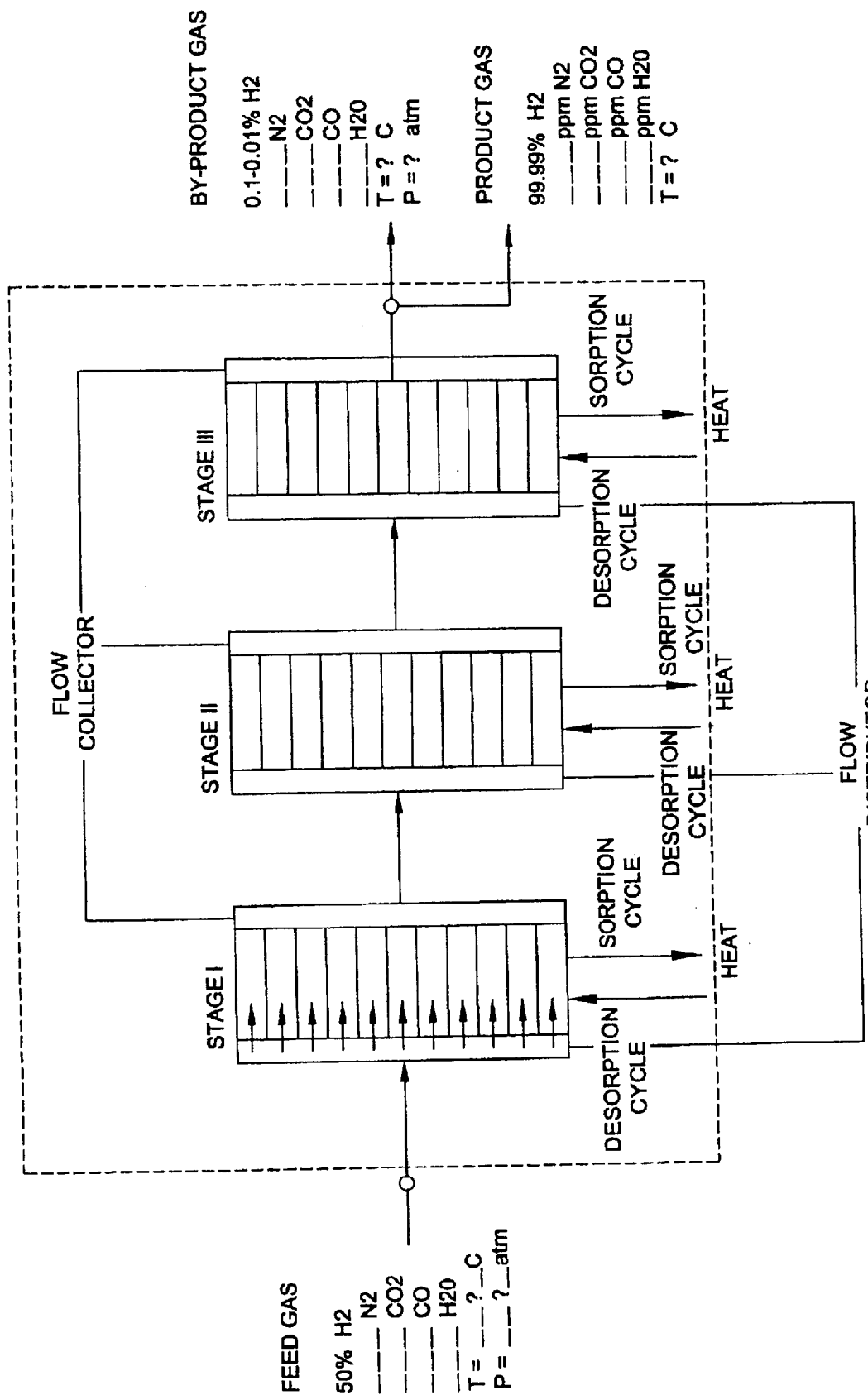
FIG. 8 schematically illustrates a multistage sorption apparatus in which multiple flow channels are utilized in each stage.

In a preferred embodiment, fast and efficient heat exchange is achieved by sandwiching a flow channel layer between heat exchanger layers. More preferably, the hydrogen separation apparatus is made up of multiple alternating layers of heat exchangers and flow channels. The heat exchangers and flow channels can be manifolded into larger systems. One such system is illustrated schematically in FIG. 8. In operation of the schematically illustrated device, a gas containing hydrogen and at least one other gaseous component passes into a first header and is distributed into multiple flow channels with intervening heat exchangers (not shown). Hydrogen is selectively sorbed into or through the Pd surfaces in the flow channels. Hydrogen-depleted gas is collected in a header and passed into a second unit (stage II) where more hydrogen is sorbed, and still more residual hydrogen can be removed in the flow channels in stage III. Finally, the hydrogen-depleted gas is released or collected through outlet 82. In some embodiments, an inlet valve is closed, and temperature is increased. At the higher temperature, hydrogen is desorbed and collected. If desired, a sweep gas could be used.

The sorbent capacity could be further increased by heating down the length of a flow channel to drive off sorbed gas while introducing feed to the beginning of a flow channel. In this technique heating is timed such that the desorbed species exits before the non-sorbed feed stream reaches the flow channel exit.

The system could be made more efficient by combusting nonsorbed hydrogen that exits with the feed stream in another area (or stage) of the apparatus where desorption is occurring. Suitable conduits and valving can be used to direct the nonsorbed hydrogen stream to a combustor layer that is in thermal contact with a sorbent layer.

Numerous additional steps could be added to the inventive methods. For example, the feed gas could be pretreated to remove constituents from the feed mixture that could poison the sorbent surface. One option is using a molecular sieve sorbent such as a zeolite in a pretreatment zone or bed. Hydrogen desorption can be made faster by using a heated sweep gas.

The flow channel(s) and heat exchanger(s) can be a stand-alone unit or can be connected to the outlet of a hydrogen-emitting device such as a steam reformer, water-gas shift reactor, etc. and the hydrogen separated can then be passed into a fuel cell—thus forming a power system. Systems incorporating the hydrogen sorption apparatus described herein can include: from large (up to 100+multi million standard cubic foot per day MMSCFD) hydrogen plants to modular hydrogen generating units (~1 MMSCFD), fuel processors for distributed electricity generators, fuel processors for automotive fuel cells, and very small fuel processors for fuel cells that displace batteries in portable devices The hydrogen separation apparatus may be formed by bonding thin metal or Pd composite plates to the heat exchanger surface, or by using Pd as the material for the walls of the heat exchanger. These plates can be quite thin—for example, one $\mu$m or less. A channeled plate for a heat exchanger could be made by techniques such as electrodischarge machining (EDM), vapor depositing metal or alloys, and electrolessly plating Pd metal, phosphide, and alloys. Flow channels could be manufactured by bonding three plates in which the center plate has a channel cut through it, and the top and bottom plates have a vapor-coated Pd internal surface. Flow channels may alternatively be electrolessly plated—a technique that provides uniform deposition throughout the structure. The plates, including the heat exchanger plates can be stacked and diffusion bonded, or sealed with the Pd-containing plate while depositing the Pd material as sorbent.

The devices can be constructed from non-metallic materials, such as plastics. For temperatures below about 400° C., there are a variety of plastics that can withstand the operating temperatures for most sorption systems. Most sorption systems operate at relatively low temperatures because the capacity of a sorbent for most solutes is inversely proportional to temperature with highest capacity achieved at low temperatures. A preferred plastic material is polyimide that can be heated electrically; thus, electric heaters could be used in place of or in addition to the heat exchange fluids. Also, the sorbent or the substrate material containing the sorbent could be electrically heated, and thus avoid heating the bulk materials that are used to construct the apparatus.

The use of thin sorbent layers is a benefit to the manufacture of in the inventive devices because surface finishing processes which produce highly reliable thin coatings can be used rather than only expensive milling techniques. Such surface finishing methods are electroless plating, electrolytic plating, sputter coating, chemical vapor deposition, electropolishing, electroforming, etc. These techniques also readily allow deposition of pure metals, alloys, and/or multi-layers of these. They can be operated in batch or highly economical continuous mode even in roll-to-roll processes, which can generate many thousands of square feet/day. These coated flat sheets are then cut and layered with flow dispersant and heat transfer fluid carrying layers to finish fabrication of the device. Final sealing can be done using adhesives, welding, diffusion bonding, brazing, etc., whichever is the most practical for the materials and dimensions involved.

The input hydrogen-containing gas may contain numerous other gases such as: CO, $CO_2$, $H_2O$, $C_1$–$C_{10}$ alkanes especially $CH_4$, $C_2H_6$, $C_3H_8$, $C_4H_{10}$, naptha and other light petroleum-based feed components, $N_2$, $O_2$, Ar, ammonia, and lower alcohols, especially methanol, ethanol and propanol, and sulfurous gases and vapors such as $SO_2$, $SO_3$, $H_2S$, $CS_2$ and COS.

The contaminated hydrogen gas feed will also have a T and P characteristic of the source of the hydrogen, and also a desirable T and P for the purified product hydrogen. It is an advantage of the invention that preconditioning the gas to a specific T and/or P is not necessary since the sorbent composition can be selected to accommodate various feed and target P–T profiles. For a particular sorbent and P–T range, the hydrogen-containing gas may flow into the flow channel at a preferred partial pressure (absolute) range of $1 \times 10^{-4}$ mbar to 20 bar; more preferably $1 \times 10^{-3}$ to 3 bar. The pressure should be kept low enough so that the apparatus doesn't burst. In some embodiments, the flow channel contains internal baffling to minimize laminar flow, or is sufficiently narrow so that the gas collides with the sorbent frequently enough to allow sorption of at least a substantial portion of the $H_2$ content. Flow rates through the apparatus will depend upon the device size and other factors such as the desired efficiency and back pressure. In preferred modes of operation, no pumping (either for evacuation or compression) is utilized, although changes in pressure will typically occur as a result of thermal cycling.

The separation process is preferably run in multiple stages where at least one latter stage is run at a lower sorption temperature than an earlier stage. More preferably, the process includes at least 3 successive sorption stages, each of which is conducted at a successively lower temperature range. As the partial pressure of hydrogen decreases, a lower temperature is used to more effectively sorb the hydrogen. This technique provides greater overall hydrogen separation while operating at narrower average temperature swings than if the temperature range was the same in all stages.

In an apparatus, a stage is a device or portion of a device, such as a parallel array of microchannels, that acts to either sorb or desorb hydrogen. A single device can have multi-staging. In a process, a stage is a sorption or desorption operation in which separation occurs, preferably one in which equilibrium is substantially reached (at least about 85%).

Description of 3-Stage Sorption Device

Figures 9B, 9C:
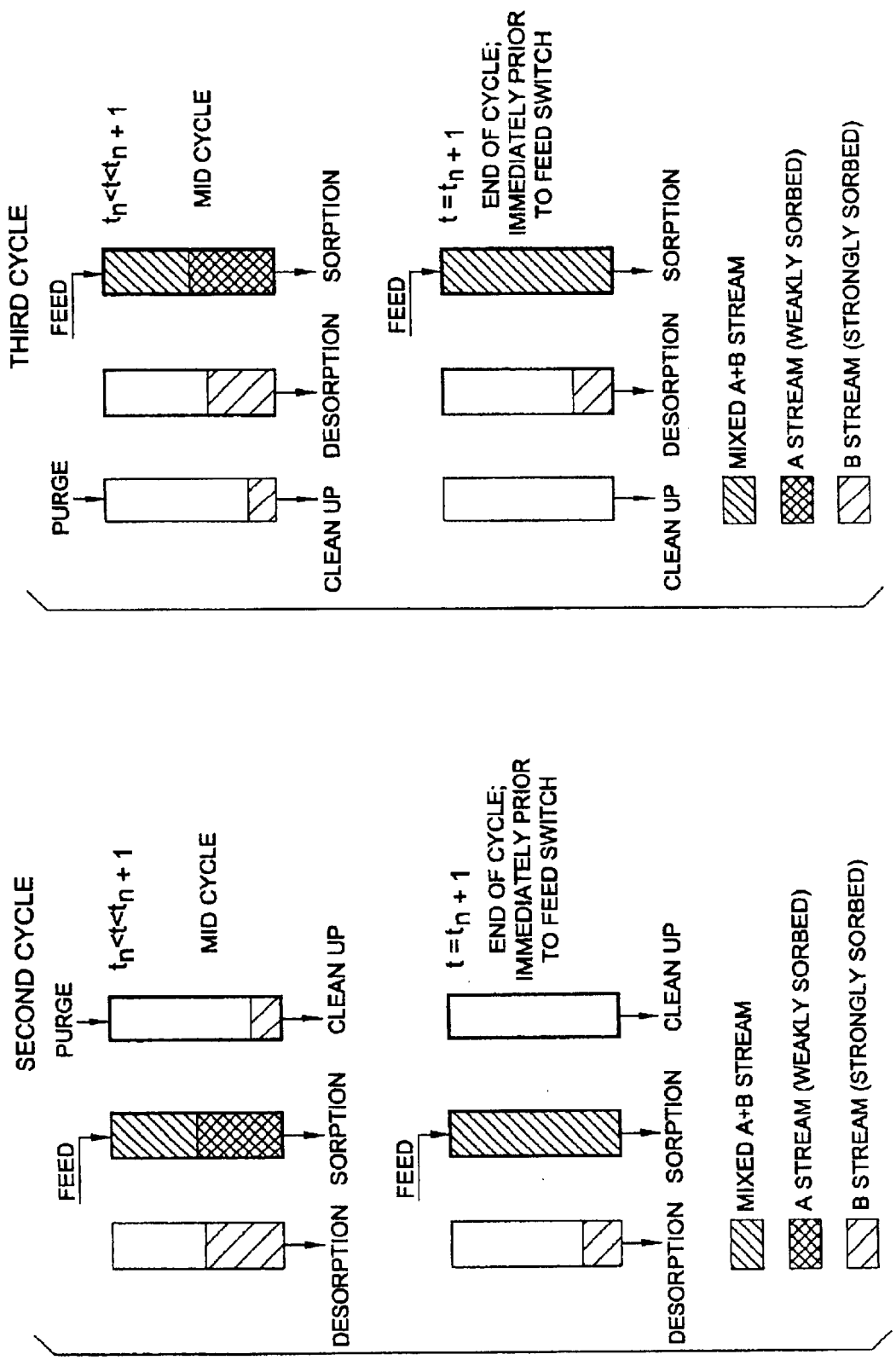

The premise of a 3-stage sorption device is similar to a 2-stage sorption device in that the temperature is lowest during the sorption cycle and highest during the desorption cycle. The feed is cycled from left to right (shown in FIGS. 9a–9c), or alternatively from right to left (not shown), in a continuous or semi-continuous fashion.

The primary difference between a 2-stage and a 3-stage sorption device is the addition of an additional stage between the desorption and sorption stage. Typically, there will also be an increase in recovered yield, product purity, and/or energy utilization. The additional channel may serve one or multiple purposes, including providing additional time for desorption if the sorbent has a high degree of surface heterogeneity including sites that strongly hold a solute or change temperature more slowly. The addition of a third stage may also be used to pre-cool the sorption channel prior to a feed switch. This will in effect increase the capacity of a particular stage because the temperature is equal to $T_c$ during all time of the sorption cycle.

The upper and lower temperature can be controlled by heated or cooled heat transfer fluid, water, or gas, including combustion gas or steam. Heating, which can be controlled by electrical joule heat) as well, preferably ranges from −50 to 1000° C. more preferably 8 to 160° C. In most instances, temperature of the flow channel is controlled by the temperature of the heat exchange fluid flowing through the heat exchanger. Temperature can be continually changing; however, temperature is preferably jumped from high to low, or from low to high points with minimal transition time, generally faster than once per 10 sec, preferably 1–10 times per second, and most preferably 100–1000 times per second. The construction of the inventive device, with its good thermal conductivity, low heat capacity, and short thermal transport distances, enables rapid temperature changes in the flow channel. This ability for rapid temperature change is further enhanced where the Pd or Pd-alloy, hydrogen-sorbing surface is disposed on the walls of the flow channel. Temperature change of the Pd surface (for example, as measured by a thermocouple) is carried out at a rate of at least 20° C./sec, with a preferred range of 200 to 2000° C./sec.

The inventive process is preferably carried out over a sorption/desorption cycle time of 0.1 to 1000 Hz; more preferably 100 to 1000 Hz. More particularly, the sorption (low T) portion of each cycle preferably occurs for 0.1 to 10 s, more preferably 0.001 to 2 s; while the desorption portion of each cycle preferably occurs for 0.1 to 1 s, more preferably 0.001 to 0.01 s.

Purity of the hydrogen obtained may be improved in several ways. The total void volume is preferably minimized in the design of the TSS sorption/desorption device. Hence, fluid passageways are preferably short and small. This feature also helps decrease the time for sorption since gas diffusion and transport distances are short. For the Pd example, over 800 volume of $H_2$ gas at STP is sorbable per volume of Pd. Hence, if the sorbent volume is $10\mu$ thick and the gas compartment is $100\mu$ thick, then approximately $\frac{1}{10}^{th}$ of the original feed gas with contaminants still resides within the gas compartment. Note that it is necessary to flow hundreds of volumes of feed gas to the sorbent in order to fully load it due to the high $H_2$ absorption coefficient for Pd. Hence, in this preferred case, even with the residual gas contaminants still present in the channel after loading, about 90% of the contaminants are removed even if this residual feed gas is allowed to remain in the feed gas compartment during the desorption cycle.

A second means of handling the contaminants in the residual feed gas are to flush the gas space with a small amount of the purified $H_2$ recycled back from the purified product stream, perhaps 0.1–10% of the product gas being recycled. The more back flush the purer the hydrogen gas product. In multi-staging TSS devices, the intermediate partially purified streams also could be used for the above flush gas to improve product gas purity and energy conservation.

A third means to minimize the cross contamination between feed gas and purified product gas is to at least partially evacuate the gas compartment for a very short (<2 s, preferably less than 0.1 s) period prior to desorbing. The vacuum exposure time is kept very short to minimize losses of $H_2$ due to premature $H_2$ desorption due to the low partial pressure of $H_2$ during evacuation. Also, complete evacuation is not required, the levels of evacuation being proportional to reach a desired residual impurity level.

The methods and apparatus of the invention can be characterized by one or more of the following properties. Preferably, in a single sorption step, hydrogen is sorbed at a rate of 0.001 to about 0.05 mol $H_2$ per cubic centimeter (cc) of sorbent, more preferably at least 0.01, and still more preferably at least 0.03 mol $H_2$ per cubic centimeter (cc) of sorbent. This sorption step preferably occurs in less than 10 seconds, and more preferably less than 1 second, and still more preferably less than 0.1 second. Preferably, in a single desorption step, hydrogen is desorbed at a rate of 0.001 to about 0.05 mol $H_2$ per cubic centimeter (cc) of sorbent, more preferably at least 0.01, and still more preferably at least 0.03 mol $H_2$ per cubic centimeter (cc) of sorbent. This desorption step preferably occurs in less than 10 seconds, more preferably less than 1 second, and still more preferably less than 0.1 second.

The most important characteristics of the invention, viewed in its totality, are the separating ability and productivity. Preferably, gas obtained from the inventive process and apparatus is at least twice as pure, more preferably at least 10 times (one tenth the initial mass of contaminants, e.g., 90% pure to 99% pure), still more preferably at least 100 times, more pure than the initial hydrogen-containing mixture. Also, preferably, the invention produces hydrogen at a rate of 100 to about 3000 standard cubic feet (scf) $H_2$ per cubic centimeter (cc) of sorbent per day, more preferably at least 1000, and still more preferably at least 2000 scf $H_2$ per cubic centimeter (cc) of sorbent per day. This rate can occur in batch, semi-continuous or continuous form, and for any fraction of a day, and, more preferably for multiple days.

EXAMPLES

Test apparatus was constructed using 0.5 inch stainless or low carbon steel tubing that had its external surface covered with a Pd coating of either Pd metal, Pd—P alloy or Pd—Ni alloy. Eight inches of the Pd-covered tube was jacketed in a 2-inch diameter tube having a gas inlet and pressure gauge. Cold water (8–15° C.) and 109–153° C. steam were passed through the tube for the cold and hot portions of a cycle, respectively.

Palladium-phosphorus alloy was electrolessly plated as follows. A palladium solution was prepared by mixing 2.0 g $PdCl_2$, 3.8 g potassium sodium tartrate tetrahydrate, 5.12 g ethylenediamine and 0.82 g sodium hypophosphite in 200 ml water and pH adjusted to 8.5 by addition of HCl. A stainless steel bar was treated with sulfuric acid, rinsed with water and wiped with toluene to remove any grease. The stainless steel bar was then reacted for 3 minutes with a sensitizer solution prepared by dissolving 2.4 g tin sulfate and 10 ml conc. HCl in 250 ml water. The sensitized steel bar was then transferred for 1 minute to a seed solution that had been prepared by dissolving 0.0125 g $PdCl_2$ and 10 ml conc. HCl in 250 ml water. The steel bar was removed, rinsed with water and immediately plated by immersing in the palladium solution. After depositing the desired thickness, the bar was removed, rinsed with isopropyl alcohol and dried. Deionized water was used in all preparations.

Palladium was electrolytically plated as follows. An electrolytic palladium solution was prepared by mixing 2.5 g diaminepalladium (II) nitrite with 27.5 g ammonium sulfamate in 250 ml water and pH adjusted to 7.5–8.5 by addition of ammonia. A stainless steel bar was cleaned by immersion in a solution of sodium hydroxide, sodium carbonate and sodium lauryl sulfate. The steel bar was removed from this solution and wiped with toluene to remove grease. Electrical wires were attached to the bar and, while the bar was in the sodium hydroxide cleaning solution, current applied for 2 minutes at a current density of 50 A/ft². The bar was removed and immediately placed in the electrolytic palladium solution and 5 A/ft² of current applied with the steel bar as the cathode. A low carbon steel was electroplated by an analogous process.

A tube coated with Pd-nickel cermet was prepared according to manufacturer's directions.

Figure 10A:
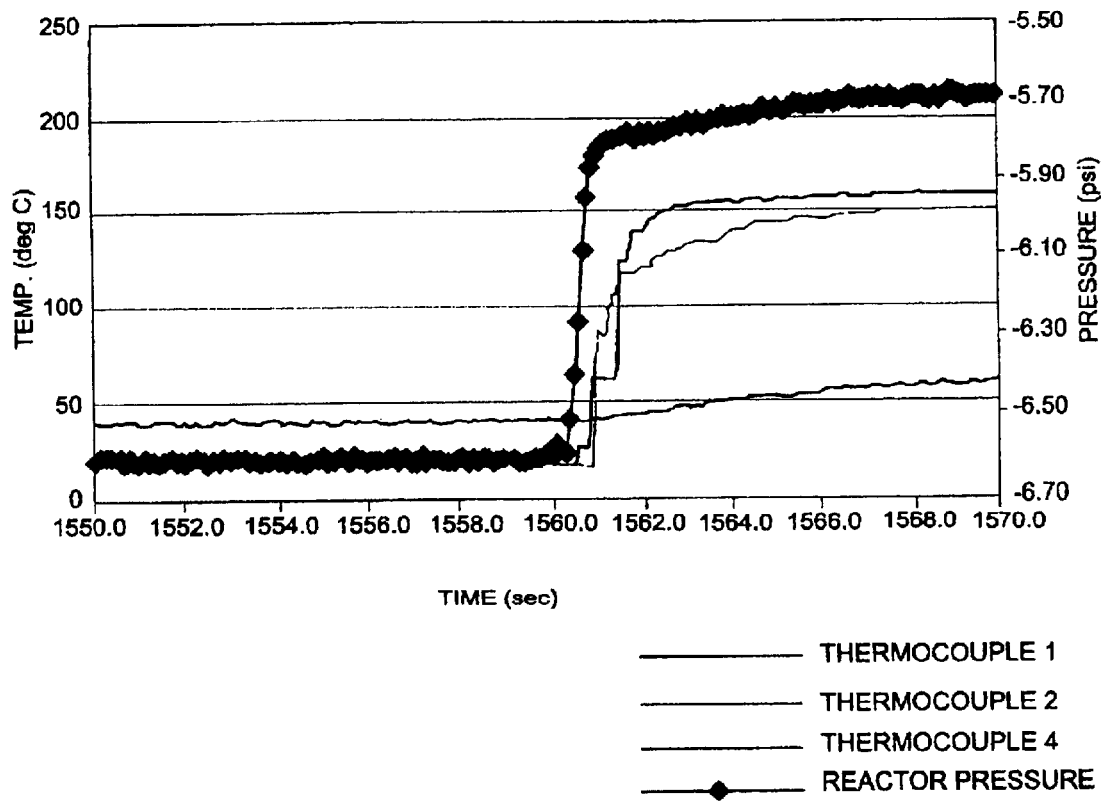
FIGS. 10a and 10b are plots of hydrogen desorption.
Figure 10B:
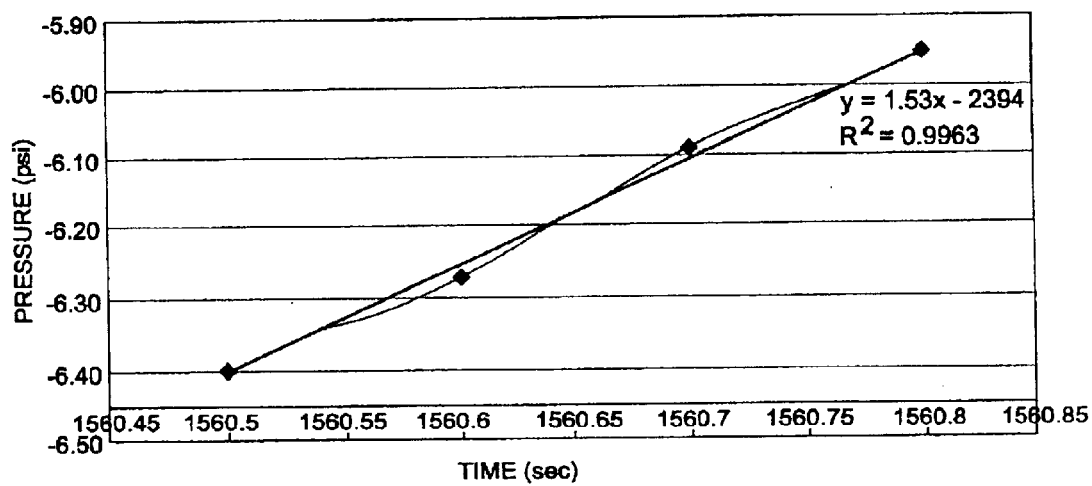

For each tube, multiple cycles were performed. Results from initial runs were discarded because residual oxygen led to spurious results (water formed), but these runs were necessary to condition the coatings. Examples of data are shown in FIGS. 10a and 10b. The results of several runs were averaged and the results are presented in the table below. Nitrogen gas and bare stainless steel were used a reference and blank, respectively.

TABLE 1

Rates of Hydrogen Sorption and Desorption

| Gas | System | Ave. Desorption Rate (PSI/sec) | Std. Dev. (PSI/sec) | Ave. Absorption Rate (PSI/sec) | Std. Dev. (PSI/sec) |
| --- | --- | --- | --- | --- | --- |
| Nitrogen | 0.2687 g Electrolytic Pd | 0.748 | 0.064 | 0.511 | 0.034 |
| Nitrogen | 12.0591 g Cermet Pd | 0.736 | 0.028 | 0.591 | 0.017 |
| Hydrogen | 12.0591 g Cermet Pd | 1.333 | 0.159 | 1.087 | 0.032 |
| Nitrogen | 0.2687 g Electrolytic Pd | 0.770 | 0.013 | 0.589 | 0.106 |
| Hydrogen | 0.2687 g Electrolytic Pd | 1.833 | 0.057 | 1.533 | 0.099 |
| Hydrogen | Bare SS | 1.367 | 0.055 | 1.033 | 0.006 |
| Nitrogen | Bare SS | 0.756 | 0.009 | 0.627 | 0.040 |
| Nitrogen | 0.67 micron Electroless Pd | 0.746 | 0.023 | 0.650 | 0.010 |
| Hydrogen | 0.67 micron Electroless Pd | 1.553 | 0.021 | 1.170 | 0.020 |

Using the reference and blank, the absorption/desorption rates are then corrected for the effect of expansion/contraction that all gases undergo due to change in temperature. In addition, rates of desorption/absorption on the method blank (a bare stainless steel bar) are subtracted in order to fully examine the effect of palladium.

$$\left[\left(\frac{\Delta p_{H_2,desorption,electroless\,Pd}}{\Delta time}\right) - \left(\frac{\Delta p_{H_2,desorption,SS}}{\Delta time}\right)\right] -$$

$$\left[\left(\frac{\Delta p_{N_2,desorption,electroles\,sPd}}{\Delta time}\right) - \left(\frac{\Delta p_{N_2,desorption,SS}}{\Delta time}\right)\right] =$$

$$\frac{\Delta p_{H_2,desorption,eletrolessPd,corrected}}{\Delta time}$$

Again, using the electroless palladium system as an example (data from Table 1):

[(1.553 psig/sec)−(1.367 psig/sec)]−[(0.746 psig/sec)−(0.756 psig/sec)]=0.186 psig/sec Note that the average desorption rate for nitrogen on palladium is less than the desorption rate for nitrogen on stainless steel. Since the difference (0.01 psig/sec) is within the uncertainty for the values, the numbers are assumed to be essentially equal.

In order to propagate the uncertainty, the general error propagation equation is used:

For $x=f(u, v, \ldots)$

Then:

$$\sigma_x^2 \cong \left(\sigma_u^2\left(\frac{\partial x}{\partial u}\right)\right)^2 + \left(\sigma_v^2\left(\frac{\partial x}{\partial v}\right)\right)^2 + \Phi$$

Because our equation is essentially X=[A−B]−[C−D], then in this case:

$$\sigma_X^2 = \left(\sigma_A^2\left(\frac{\partial X}{\partial A}\right)\right)^2 + \left(\sigma_B^2\left(\frac{\partial X}{\partial B}\right)\right)^2 + \left(\sigma_C^2\left(\frac{\partial X}{\partial C}\right)\right)^2 + \left(\sigma_D^2\left(\frac{\partial X}{\partial D}\right)\right)^2$$

or $$\sigma_X^2 = \sigma_A^2(1)^2 + \sigma_B^2(-1)^2 + \sigma_C^2(1)^2 + \sigma_D^2(-1)^2 = \sigma_A^2 + \sigma_B^2 + \sigma_C^2 + \sigma_D^2$$

finally, $$\sigma^x = \sqrt{(0.021 \text{ psig/sec})^2 + (0.021 \text{ psig/sec})^2 + (0.021 \text{ psig/sec})^2 + (0.021 \text{ psig/sec})^2}$$

$$\sigma^x = 0.0064 \text{ psig/sec}$$

So the corrected rate of hydrogen desorption for the electroless palladium system is reported to be 0.186±0.064 psig/sec. As this is a change in pressure, then psig/sec=psia/sec.

The next step is to convert from psia/sec to moles of hydrogen gas released upon desorption. This conversion is accomplished using the ideal gas law, pV=nRT. In this case, $(\Delta p/dt)V=(\Delta n/dt)RT$, where $(\Delta p/dt)$ is the rate of desorption in psia/sec (calculated above), V is the volume of the reactor (0.620±0.001 L), $(\Delta n/dt)$ is the rate of desorption in moles of hydrogen/sec, R is the ideal gas constant (1.206049 L*psia/mol*K), and T is the desorption temperature (150° C.≅423 K). So, $$\frac{\Delta n}{dt} = \frac{(\Delta p/dt)V}{RT}$$

$$= \frac{(0.186 \text{ psia/sec})(0.620 \text{ L})}{\left(\frac{1.206049 \text{ L} \cdot \text{atm}}{\text{mol} \cdot \text{K}}\right)(423 \text{ K})} = 0.000226 \text{ mol/sec}$$

Error is again propagated using the general error propagation equation, and this value is reported as $(2.26\pm0.78)\times10^{-4}$ mol $H_2$/sec. For the electroless palladium system, the mass of palladium plated onto the bar was determined with an electronic balance to be 0.0661±0.0001 g. Because palladium has a known density of 12.02 g/cm³, the volume of palladium plated is calculated using $$V_{Pd} = \frac{Mass_{Pd}}{Density_{Pd}} = \frac{0.0661 \text{ g}}{12.02 \left(\frac{\text{g}}{\text{cm}^3}\right)} = 0.005499 \text{ cm}^3 \text{ Pd}$$

As before, error is propagated and the volume of palladium plated is reported as $(5.50\pm0.01)\times10^{-3}$ cm³. The amount of hydrogen gas produced per second per cubic centimeter of palladium, β, can now be calculated, $$\beta = \frac{dn/dt}{V_{Pd}} = \frac{(0.000226 \text{ mol } H_2/\text{sec})}{(0.00550 \text{ cm}^3 \text{ Pd})} = \frac{0.0411 \text{ mol } H_2}{\text{sec} \cdot \text{cm}^3 \text{ Pd}}$$

After error propagation, β is reported to be $(4.11\pm1.41)\times10^{-2}$ mol $H_2$/sec*cm³ Pd.

From FIG. 10a, the approximate desorption time is ≅0.6 seconds. This value is recorded, and then along with the desorption time for cycles five and six, an average desorption time is calculated. For the electroless palladium system, the average desorption time is 0.6±0.1 seconds. It is now possible to calculate the moles of hydrogen released upon desorption per cycle per cubic centimeter of palladium, ε, $$\varepsilon = \beta \times \text{Cycle Time} = \left(\frac{0.0411 \text{ mol } H_2}{\text{sec} \cdot \text{cm}^3}\right) \times 0.6 \text{ seconds}$$

$$= \frac{0.0247 \text{ mol } H_2}{\text{cycle} \cdot \text{cm}^3}$$

After error propagation, $\varepsilon=(2.47\pm0.94)\times10^{-2}$ mol $H_2$/cycle*cm³ Pd.

Knowing the cycle time, it is possible to calculate the theoretical number of desorption cycles per day, ν

$$\nu = \frac{(\text{seconds/day})}{(\text{seconds/cycle})}$$

$$= \frac{(86400 \text{ seconds/day})}{(0.6 \text{ seconds/cycle})}$$

$$= 144000 \text{ cycles/day}$$

which is reported as ν=144000±24000 cycles/day.

Finally, the standard cubic feet of hydrogen released per day per cubic centimeter of palladium, φ, can be calculated:

$$\varphi = \varepsilon \nu \left(\frac{22.4 \text{ L } H_2}{\text{mol } H_2}\right)\left(\frac{0.0353 \text{ scf } H_2}{\text{L } H_2}\right)$$

$$= \left(\frac{0.0247 \text{ mol } H_2}{\text{cycle} \cdot \text{cm}^3}\right)\left(\frac{144000 \text{ cycle}}{\text{day}}\right)\left(\frac{22.4 \text{ L } H_2}{\text{mol } H_2}\right)\left(\frac{0.0353 \text{ scf } H_2}{\text{L } H_2}\right)$$

$$\varphi = \frac{2812 \text{ scf } H_2}{\text{day} \cdot \text{cm}^3 \text{ Pd}}$$

After error propagation, this value is reported to be:

$$\varphi=(2.81\pm1.17)\times10^3 \text{ scf } H_2/\text{day*cm}^3 \text{ Pd}.$$

Thus, in order to desorp one million standard cubic feet of hydrogen per day, the required amount of palladium, $V_{Pd, MSCF}$, is:

$$V_{Pd,MSCF} = \frac{(1000000 \text{ scf } H_2/\text{day})}{\varphi}$$

$$= \frac{(1000000 \text{ scf } H_2/\text{day})}{(2810 \text{ scf } H_2/\text{day} \cdot \text{cm}^3 \text{ Pd})}$$

$$= 356 \text{ cm}^3 \text{ Pd}$$

reported as $(3.56\pm1.48)\times10^2$ cm$^3$ Pd. Converting this value to mass of palladium, $m_{Pd,MSCF}$, $m_{Pd,MSCF}=V_{Pd,MSCF}\times\text{Density}_{Pd}=(356 \text{ cm}^3 \text{ Pd})\times(0.01202 \text{ kg/cm}^3 \text{ Pd})=4.28 \text{ kg Pd}$ reported as $4.28\pm1.79$ kg Pd. These calculations were repeated for absorption, and for the electrolytic palladium system.

For the following conditions:

Initial pressure=−7.00+/−0.05 psig
Initial Temperature=298+/−3 K
ΔT for desorption=+139 K (423 K) (150° C.)
ΔT for absorption=−139 K (284 K) (11° C.)

Electrolessly plated Palladium (on stainless steel):
  desorption rate=$(2.81\pm1.17)\times10^3$ scf H$_2$/(day*cm$^3$ Pd)
    $m_{Pd,MSCF}=4.28\pm1.79$ kg Pd
  absorption rate=$(2.55\pm1.36)\times10^3$ scf H$_2$/(day*cm$^3$ Pd)
    $m_{Pd,MSCF}=4.71\pm2.51$ kg Pd.
  single cycle desorption=$(2.47\pm0.94)\times10^{-2}$ mol H$_2$/cm$^3$ Pd
  single cycle absorption=$(4.11\pm1.82)\times10^{-2}$ mol H$_2$/cm$^3$ Pd
Electroless system characteristics:

0.0661 g Pd=$5.50\times10^{-3}$ cm$^3$ Pd=$6.211\times10^{-4}$ mol Pd=0.672 micron thickness over an area of 81.79 cm$^2$. Desorption Cycle Time=$0.6\pm0.1$ sec. Absorption Cycle Time=$1.1\pm0.2$ sec.

Electrolytically plated Palladium (on low carbon steel):
  desorption rate=$(1.73\pm0.49)\times10^3$ scf H$_2$/(day*cm$^3$ Pd)
    $m_{Pd,MSCF}=6.95\pm1.97$ kg Pd
  absorption rate=$(2.77\pm0.76)\times10^3$ scf H$_2$/(day*cm$^3$ Pd)
    $m_{Pd,MSCF}=4.34\pm1.19$ kg Pd
  single cycle desorption=$(2.03\pm0.51)\times10^{-2}$ mol H$_2$/cm$^3$ Pd
  single cycle absorption=$(3.64\pm0.91)\times10^{-2}$ mol H$_2$/cm$^3$ Pd
Electrolytic system characteristics:

0.2687 g Pd=$2.235\times10^{-2}$ cm$^3$ Pd=$2.525\times10^{-3}$ mol Pd=2.80 micron thickness over an area of 79.80 cm$^2$. Desorption Cycle Time=$0.8\pm0.1$ sec. Absorption Cycle Time=$0.9\pm0.1$ sec.

In addition, it was discovered that the sorption/desorption rates for hydrogen gas in the current invention increase with partial pressure of the hydrogen ($P_{H2}$). This increase in rate with $P_{H2}$ is illustrated in Table 2 where two sets of sorption/desorption data are compared in which the $P_{H2}$ of the feed gas was varied by about a factor of 2.17.

TABLE 2

| Sorbent | $P_{H2}$ (psia) | Observed Sorption Rate (psi/sec) | Observed Desorption Rate (psi/sec) | Temperature Jump Range (° C.) |
|---|---|---|---|---|
| Pd—P alloy (prepared by electroless plating) | 7.600 | 1.170 | 1.553 | 107 |
| Pd—P alloy (prepared by electroless plating) | 16.526 | 2.364 | 2.654 | 83 |

Although we do not wish to be bound by any theories, this unexpected result for the desorption case, which normally may not be expected to show a $P_{H2}$ dependence (Laidler, K. J., "Chemical Kinetics", McGraw-Hill (New York, N.Y.), 1965, p259ff), is suspected might be due to the higher loading of H$_2$ in the sorbent during the sorption cycle. This feed pressure benefit is significant as the higher rate allows even lower temperature jump ranges to be employed to practice the invention. Such shorter jump times reduces process cycle times and heat transfer requirements, thereby decreasing energy requirements and increasing the productivity of purified hydrogen for a given apparatus design and configuration.

While preferred embodiments of the present invention have been described, it will be apparent to those skilled in the art that many changes and modifications may be made without departing from the invention in its broader aspects. The appended claims are therefore intended to cover all such changes and modifications as fall within the true spirit and scope of the invention.

We claim:

1. An hydrogen separation apparatus comprising:
    at least 3 layers wherein each of said at least 3 layers comprises at least one flow channel having an internal surface that comprises palladium on at least a portion of the internal surface, each flow channel having at least one dimension of 1 cm or less; and
    wherein the at least 3 layers alternate with at least 4 layers, wherein each of said at least 4 layers comprises a heat exchanger that is in thermal contact with a flow channel.

2. The apparatus of claim 1 comprising a porous sorbent monolithic insert within the flow channel, and wherein the internal surface comprises the surface of the porous sorbent.

3. The apparatus of claim 2 wherein the palladium is a palladium-silver alloy.

4. The apparatus of claim 1 comprising a sorbent layer on a wall of the flow channel and further comprising an open channel within the flow channel; wherein the flow channel comprises an inlet, an outlet and a sorbent disposed between the inlet and the outlet and wherein the open channel is connected to the inlet and the outlet.

5. The apparatus of claim 4 wherein the open channel has a height of 0.1 mm or less.

6. The apparatus of claim 2 wherein the porous sorbent comprises a thermally-conductive felt or thermally-conductive continuously porous foam.

7. An hydrogen separation apparatus comprising:
    a flow channel having an internal surface that comprises palladium on at least a portion of the internal surface, the flow channel having at least one dimension of 1 cm or less; and
    a heat exchanger in thermal contact with the flow channel; and further comprising a porous sorbent monolithic insert within the flow channel, and wherein the internal surface comprises the surface of the porous sorbent;

wherein the porous sorbent substantially fills the flow channel.

8. The apparatus of claim 7 comprising: at least 4 layers, each of said at least 4 layers comprising a microchannel heat exchanger; alternating with at least 3 layers comprising at least one flow channel in each of said at least 3 layers.

9. The apparatus of claim 8 wherein the sorbent comprises a hydrogen sorbent having a surface coating over more than 90% of the surface of the hydrogen sorbent, wherein the surface coating comprises palladium and wherein the sorbent has a thickness of 0.0001 to 1 mm.

10. The apparatus of claim 4 wherein the sorbent comprises a promoter on the surface of the sorbent.

11. The apparatus of claim 7 comprising at least one first gas inlet to a first at least 3 layers, wherein each layer comprises at least one flow channel;

at least one first gas outlet from said first at least 3 layers comprising at least one flow channel;

said at least one first gas outlet connected to at least one second gas inlet to a second at least 3 layers comprising at least one flow channel;

at least one second gas outlet from said second at least 3 layers, wherein each layer comprises at least one flow channel; and further comprising a first at least 4 layers alternating with said first at least 3 layers, each of said first at least 4 layers comprising a microchannel heat exchanger; and a second at least 4 layers alternating with said second at least 3 layers, each of said second at least 4 layers comprising a microchannel heat exchanger.

12. A use of the apparatus of claim 1 to purify hydrogen from a hydrogen-containing gas mixture.

13. An hydrogen separation apparatus comprising:

a flow channel comprising an inlet, an outlet and a sorbent disposed between the inlet and the outlet;

wherein the sorbent comprises a hydrogen sorbent having a surface coating over more than 90% of the surface of the hydrogen sorbent, wherein the surface coating comprises palladium; and a heat exchanger in thermal contact with the sorbent; and wherein the heat exchanger is a microchannel heat exchanger, and further comprising at least 4 layers, each of said at least 4 layers comprising a microchannel heat exchanger; alternating with at least 3 layers comprising at least one flow channel in each of said at least 3 layers.

14. The apparatus of claim 13 wherein the hydrogen sorbent comprises a material selected from the group consisting of Ti, V, nickel lanthanide, and Ni.

15. The apparatus of claim 13 comprising a surface coating of Pd or a Pd alloy that has a thickness of less than 0.025 mm.

16. The apparatus of claim 13 wherein the sorbent has a thickness of 0.0001 to 1 mm.

17. An hydrogen separation apparatus comprising:

a flow channel having an internal surface that comprises palladium on at least a portion of the internal surface, the flow channel having at least one dimension of 1 cm or less; and a heat exchanger in thermal contact with the flow channel;

wherein the heat exchanger is a mierochannel heat exchanger that is directly adjacent to the flow channel; and wherein the flow channel has a height of less than 1 cm.

18. The apparatus of claim 17 wherein the flow channel and the heat exchanger share a common, thermally-conductive wall.

19. The apparatus of claim 17 wherein at least 80% of the internal surface of the flow channel is coated with Pd or a Pd alloy.

20. The apparatus of claim 19 wherein the flow channel has a height of less than 2 mm.

21. The apparatus of claim 20 having a width of 2 to 25 cm.

22. The apparatus of claim 17 wherein the internal surface comprises a continuous layer of Pd or a Pd alloy.

23. The apparatus of claim 17 wherein the flow channel comprises a hydride-forming sorbent sublayer having a thickness of 10 nm to 1 mm that is coated with a surface-exposed sublayer comprising Pd; wherein the internal surface that comprises palladium comprises the surface-exposed sublayer comprising Pd.

24. The apparatus of claim 23 wherein the surface-exposed sublayer comprising Pd has a thickness of less than 0.025 mm.

25. The apparatus of claim 23 wherein at least 80% of the internal surface of the flow channel comprises the surface-exposed sublayer comprising Pd.

26. The apparatus of claim 23 wherein the hydride-forming sorbent sublayer has a thickness of 0.004 to 0.1 mm.

27. The apparatus of claim 17 wherein the flow channel comprises a hydride-forming sorbent and a promoter or an intermetallic that improves hydrogen dissociation kinetics.

28. The apparatus of claim 17 wherein the flow channel comprises a porous sorbent having a pore volume of 5 to 98%.

29. The apparatus of claim 28 wherein the porous sorbent substantially fills the flow channel.

30. The apparatus of claim 8 wherein at least 80% of the internal surface of the flow channel is coated with Pd or a Pd alloy.

31. The apparatus of claim 18 wherein the heat exchanger and the flow channel are substantially coextensive; and wherein the internal surface comprises a surface-exposed, continuous layer of Pd or a Pd alloy having thickness of less than 0.025 mm.

32. The apparatus of claim 18 further comprising an electrical resistor in thermal contact with an electrical resistor.

33. The apparatus of claim 1 further comprising an electrical resistor in thermal contact with a flow channel.

34. The apparatus of claim 1 wherein the at least one flow channel in each of the at least three layers comprises a hydride-forming sorbent sublayer having a thickness of 10 nm to 1 mm that is coated with a surface-exposed sublayer comprising Pd.

35. The apparatus of claim 34 wherein the surface-exposed sublayer comprising Pd has a thickness of less than 0.025 mm.

36. The apparatus of claim 23 further comprising Ru particles on the surface of the surface-exposed sublayer comprising Pd.

37. The apparatus of claim 34 wherein the at least one flow channel in each of the at least three layers has a height of less than 2 mm.

38. The apparatus of claim 7 wherein the heat exchanger is formed by the combination of an electrical resistance heater with a coolant fluid.

39. The apparatus of claim 34 wherein the sorbent is an electrically insulating material that is in thermal contact with a heat sink.

40. The apparatus of claim 17 wherein a flow channel layer comprises the flow channel; and further wherein the flow channel layer is sandwiched between heat exchanger layers.

41. The apparatus of claim 40 comprising a porous sorbent in the flow channel, wherein the porous sorbent has a pore volume of 5 to 98%, and wherein the porous sorbent is coated with a continuous layer comprising Pd.

42. The apparatus of claim 40 wherein at least 80% of the internal surface of the flow channel is coated with Pd or a Pd alloy.

43. An hydrogen separation apparatus comprising:

a flow channel comprising an inlet, an outlet, an open channel connecting the inlet and the outlet, and a sorbent disposed between the inlet and the outlet;

wherein the sorbent comprises a hydrogen sorbent having a surface coating over more than 90% of the surface of the hydrogen sorbent, wherein the surface coating comprises palladium; and a heat exchanger in thermal contact with the sorbent;

wherein a flow channel layer comprises the flow channel; and further wherein the flow channel layer is sandwiched between heat exchanger layers.

44. The hydrogen separation apparatus of claim 43 wherein the flow channel has a height of less than 1 cm.

45. The hydrogen separation apparatus of claim 44 wherein the sorbent has a thickness of 10 nm to 1 mm the surface coating has a thickness of less than 0.025 mm.

46. The hydrogen separation apparatus of claim 44 wherein the flow channel is adjacent to a microchannel heat exchanger.

47. The hydrogen separation apparatus of claim 44 wherein the sorbent comprises a thermally-conductive felt or thermally-conductive continuously porous foam having a thickness between 100 and 500 microns.

48. An hydrogen separation apparatus comprising:

a flow channel comprising an inlet, an outlet and a sorbent disposed between the inlet and the outlet;

wherein the sorbent comprises a hydrogen sorbent having a surface coating over more than 90% of the surface of the hydrogen sorbent, wherein the surface coating comprises palladium; and a heat exchanger in thermal contact with the sorbent;

wherein the sorbent has a thickness of 10 nm to 1 mm;

wherein a flow channel layer comprises the flow channel; and further wherein the flow channel layer is adjacent to the heat exchanger and wherein the heat exchanger and the flow channel layer are substantially coextensive.

49. The apparatus of claim 48 wherein the surface coating comprising Pd has a thickness of less than 0.025 mm.

50. The apparatus of claim 48 wherein the flow channel has a height of less than 2 mm.

51. The hydrogen separation apparatus of claim 50 wherein a flow channel layer comprises the flow channel; and further whereinthe flow channel layer is adjacent to a heat exchanger wherein the heat exchanger has a height of less than about 2 mm and wherein the heat exchanger and the flow channel layer are substantially coextensive.

52. The apparatus of claim 48 wherein the surface coating comprising Pd has a thickness of 0.0001 to 0.02 mm.

* * * * *